(12) United States Patent
Spivey et al.

(10) Patent No.: US 11,030,735 B2
(45) Date of Patent: Jun. 8, 2021

(54) SUBTERRANEAN DRILL BIT MANAGEMENT SYSTEM

(71) Applicant: ExxonMobil Upstream Research Company, Spring, TX (US)

(72) Inventors: Benjamin J. Spivey, Houston, TX (US); Paul E. Pastusek, The Woodlands, TX (US); Derek M. Sanderson, Midland, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 49 days.

(21) Appl. No.: 16/513,902

(22) Filed: Jul. 17, 2019

(65) Prior Publication Data
US 2020/0051237 A1    Feb. 13, 2020

Related U.S. Application Data

(60) Provisional application No. 62/716,593, filed on Aug. 9, 2018.

(51) Int. Cl.
| | | |
|---|---|---|
| G06T 7/00 | (2017.01) | |
| G01N 21/88 | (2006.01) | |
| G06T 3/40 | (2006.01) | |
| G06T 3/60 | (2006.01) | |
| G06T 7/13 | (2017.01) | |
| G06N 3/02 | (2006.01) | |
| G06N 20/00 | (2019.01) | |

(52) U.S. Cl.
CPC ....... *G06T 7/0004* (2013.01); *G01N 21/8851* (2013.01); *G06N 3/02* (2013.01); *G06N 20/00* (2019.01); *G06T 3/40* (2013.01); *G06T 3/60* (2013.01); *G06T 7/13* (2017.01); *G06T 2200/24* (2013.01); *G06T 2207/10024* (2013.01); *G06T 2207/20081* (2013.01); *G06T 2207/20084* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 4,845,763 A | 7/1989 | Bandyopadhyay et al. | |
| 9,670,649 B2 | 6/2017 | Bewley et al. | |
| 10,282,834 B1* | 5/2019 | Finch | G06T 7/001 |
| 10,346,969 B1* | 7/2019 | Raghu | G01N 21/8803 |
| 2003/0118230 A1 | 6/2003 | Song et al. | |
| 2013/0113914 A1* | 5/2013 | Scheid | G01N 21/8851 348/82 |
| 2013/0113915 A1* | 5/2013 | Scheid | G05B 19/41875 348/82 |

(Continued)

FOREIGN PATENT DOCUMENTS

WO    WO2017/082874    5/2017

*Primary Examiner* — Justin P. Misleh
(74) *Attorney, Agent, or Firm* — ExxonMobil Upstream Research Company—Law Department

(57) ABSTRACT

A method for characterizing damage to bits or bottom hole assemblies can include identifying, via a supervised learning model, a location, an extent, a type, a consistency, or any combination thereof of damage to a bit or a bottom hole assembly from an image of the bit or the bottom hole assembly. A graphical output is generated based on the damage to the at least one component of the bit or the bottom hole assembly.

18 Claims, 18 Drawing Sheets

(56) References Cited

U.S. PATENT DOCUMENTS

| | | |
|---|---|---|
| 2018/0005362 A1 | 1/2018 | Wang et al. |
| 2019/0145183 A1* | 5/2019 | Potash |
| 2019/0279356 A1* | 9/2019 | Kuwertz ............... G06N 3/0472 |
| 2020/0026257 A1* | 1/2020 | Dalal ................. G05B 19/4184 |

\* cited by examiner

100

200

400

1400

SUBTERRANEAN DRILL BIT MANAGEMENT SYSTEM

CROSS-REFERENCE TO RELATED APPLICATION

This application claims the benefit of U.S. Provisional Patent Application Ser. No. 62/716,593, filed Aug. 9, 2018, the entirety of which is incorporated by reference herein.

FIELD

The techniques described herein relate to devices for down hole drilling operations. More particularly, the techniques relate to systems and methods for analyzing damage to drill bits and bottom hole assemblies (BHAs) using neural networks.

BACKGROUND

This section is intended to introduce various aspects of the art, which may be associated with examples of the present techniques. This discussion is believed to assist in providing a framework to facilitate a better understanding of particular aspects of the present techniques. Accordingly, it should be understood that this section should be read in this light, and not necessarily as admissions of prior art.

Forensic analysis on drill bits and bottom hole assemblies (BHAs) pulled out of a drilling hole is foundational for continuous drilling improvement. By current practice for major project wells, drilling engineers or field personnel capture drill bit and BHA photos to document damage and wear patterns, direction of loading, and damage locations. The photos may be the only evidence to diagnose root causes of drilling dysfunction and to make decisions on corrective actions. Root causes for drill bit and BHA damage include torsional and axial vibration, forward and reverse whirl, parameter set points, dog-legs, erosion, borehole patterns, excessive loading, balling, and junk damage, among others. Photos are also used to gain insight into borehole quality. Engineers may use the diagnosis to redesign the drill bit and/or BHA and change operational practices to mitigate the root causes.

Current bit forensics practice relies on field personnel or trained drilling engineers to classify drill bit and BHA damage and interpret the results. Classifying drill bit and BHA damage can be a subjective process. Interpretation may require engineers and expert advice and varies within and across drill teams. The subjective aspect of interpretation limits the usage of forensics output for more widespread data analytics. Additionally, classifying drill bit and BHA damage is also a time-consuming process requiring training. Furthermore, analyzing dull grading of drill bits is cost prohibitive for remote projects.

In some examples, the bottom hole assembly or BHA can include a stabilizer that can also be damaged. A stabilizer is an implement used in downhole drilling operations to hold a drill string essentially concentrically in place in a well bore. A stabilizer can be composed of a cylindrical body and a set of stabilizer blades that form an effective diameter similar to that of the drill string's drill bit which is nominally the same diameter as the wellbore (or borehole) when initially drilled. The stabilizer blades can help keep the drill string aligned so as to avoid unintentional sidetracking or vibrations and to reduce the contact area between the drill string and the wellbore during operation. Accordingly, classifying damage to the stabilizer can also enable redesigning and manufacturing new stabilizers to prevent damage.

Several patents and pieces of literature discuss systems in which cutting tools can be analyzed and defects in oil and gas pipes can be detected. For example, WO2017/082874 discusses defect discrimination techniques. The techniques of WO2017/082874 include using machine vision image processing for detecting known defects in oil and gas pipes. However, the techniques are focused on exciting eddy currents in the pipes to determine defect locations. The techniques of this reference cannot identify damaged components of a drill bit or bottom hole assembly using a neural network.

Additionally, U.S. Pat. No. 9,670,649 describes using vision recognition software to determine the leading edge of each wear member on the lip of an excavator bucket. However, the techniques of this reference cannot identify damaged components of a drill bit or bottom hole assembly using a neural network.

Similarly, U.S. Pat. No. 4,845,763 describes a method for measuring wear of a cutting tool involving illuminating the tool face, acquiring and storing a digital image in gray scale, segmenting the wear regions based on contrast, extracting edges of new and worn tools, and measuring dimensions of worn regions. However, the techniques of this reference cannot identify damaged components of a drill bit or bottom hole assembly using a neural network.

These references fail to disclose generating neural networks to identify features or components within the drill bit and BHA as discussed below. The neural networks described herein can also identify a cause of damage to the drill bit and BHA. At present, there is not an automated technique for identifying damage to drill bits and BHAs in the oilfield industry.

SUMMARY

An example embodiment provides a system for characterizing damage to bits or bottom hole assemblies comprising a processor to identify, via a supervised learning model, a location, an extent, a type, a consistency, or any combination thereof of damage to a bit or a bottom hole assembly from an image of the bit or the bottom hole assembly. The processor can generate a graphical output based on the damage to the at least one component of the bit or the bottom hole assembly. The processor can also identify, via the supervised learning model, a cause of the damage to the bit or the bottom hole assembly based on the image.

Another example embodiment provides a method for characterizing damage to bits or bottom hole assemblies. The method can include identifying, via a supervised learning model, a location, an extent, a type, a consistency, or any combination thereof of damage to a bit or a bottom hole assembly from an image of the bit or the bottom hole assembly, wherein the image is detected in response to drilling a wellbore with a drill string comprising the bit or the bottom hole assembly within a subsurface region. The method can include generating a graphical output based on the damage to the at least one component of the bit or the bottom hole assembly. The method can also include identifying, via the supervised learning model, a cause of the damage to the bit or the bottom hole assembly based on the image.

In another embodiment, one or more non-transitory computer-readable media for characterizing damage to drill bits or bottom hole assemblies can include a plurality of instructions that, in response to execution by a processor, direct the processor to identify, via a supervised learning model, a location, an extent, a type, a consistency, or any combination thereof of damage to a bit or a bottom hole assembly from an image of the bit or the bottom hole assembly. The plurality of instructions can also direct the processor to generate a graphical output based on the cause of damage to the at least one component of the bit or the bottom hole assembly. The plurality of instructions can also direct the processor to identify, via the supervised learning model, a cause of the damage to the bit or the bottom hole assembly based on the image.

The foregoing summary has outlined rather broadly the features and technical advantages of examples in order that the detailed description of the techniques that follow may be better understood. It should be appreciated by those skilled in the art that the conception and specific embodiment disclosed may be readily utilized as a basis for modifying or designing other structures for carrying out the same purposes of the present techniques. It should also be realized by those skilled in the art that such equivalent constructions do not depart from the spirit and scope of the techniques described below. The novel features which are believed to be characteristic of the techniques below, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present techniques.

DESCRIPTION OF THE DRAWINGS

The foregoing and other advantages of the present techniques may become apparent upon reviewing the following detailed description and drawings of non-limiting examples in which.

Figure 1:
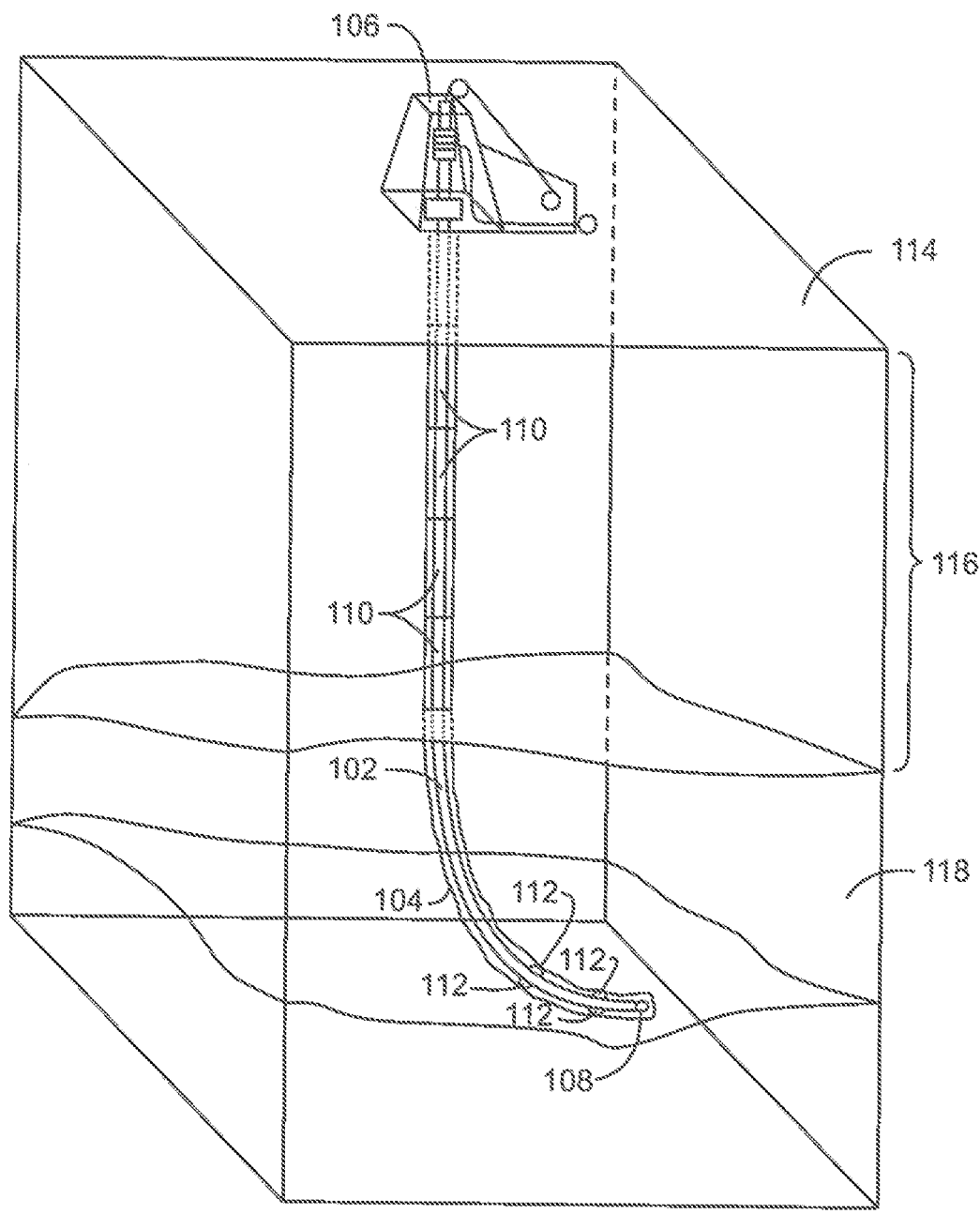
FIG. 1 is an illustration of a system for downhole drilling.

It should be noted that the figures are merely examples of the present techniques and no limitations on the scope of the present techniques are intended thereby. Further, the figures are generally not drawn to scale, but are drafted for purposes of convenience and clarity in illustrating various aspects of the techniques.

DETAILED DESCRIPTION

In the following detailed description section, the present techniques are described in connection with specific examples. However, to the extent that the following description is specific to a particular embodiment or a particular use of the present techniques, this is intended to be for example purposes only and simply provides a description of the examples. Accordingly, the techniques are not limited to the specific examples described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Blade" and "blades" may be used in this application to include, but are not limited to, various types of projections extending outwardly from a wellbore tool, such as a drill bit or drill string. Such wellbore tools may have generally cylindrical bodies with associated blades extending radially therefrom. Blades formed in accordance with teachings of the present disclosure may have a wide variety of configurations including, but not limited to, helical, spiraling, tapered, converging, diverging, symmetrical, and/or asymmetrical. Such blades may also be used on wellbore tools which do not have a generally cylindrical body.

"Drilling" as used herein may include, but is not limited to, rotational drilling, slide drilling, directional drilling, non-directional (straight or linear) drilling, deviated drilling, geosteering, horizontal drilling, and the like. The drilling method may be the same or different for the offset and uncased intervals of the wells. Rotational drilling may involve rotation of the entire drill string, or local rotation downhole using a drilling mud motor, where by pumping mud through the mud motor, the bit turns while the drill string does not rotate or turns at a reduced rate, allowing the bit to drill in the direction it points.

As used herein, a "drill bit" is a tool normally utilized in wellbore operations to cut or crush rock formations to penetrate the formations. In some examples, the drill bit is on the bottom of a drill string. Drill bits can scrape or crush rock formations as part of a rotational motion. In some examples, drill bits known as hammer bits, pound the rock vertically to penetrate the formations.

A "drill string" is understood to include a collection or assembly of joined tubular members, such as casing, tubing, jointed drill pipe, metal coiled tubing, composite coiled tubing, drill collars, subs and other drill or tool members. The drill string extends between the surface and on the lower end of the work string and is connected to the drill bit that forms the wellbore. A drill string may be used for drilling or an installation means. It should be appreciated that the drill string may be made of steel, a steel alloy, a composite, fiberglass, or other suitable material.

A "neural network" is understood to include any suitable set of instructions or a hardware device that can be trained or learn to perform a task based on examples. In some examples, the neural network can be programmed without any task-specific rules. For example, the neural network can identify objects in images by analyzing manually labeled images with objects. In some examples, the neural network can be trained using unsupervised techniques.

A "sleeve" is a tubular part designed to fit over another tubular part. The inner and outer surfaces of the sleeve may be circular or non-circular in cross-section profile. The inner and outer surfaces may generally have different geometries, i.e., the outer surface may be cylindrical with circular cross-section, whereas the inner surface may have an elliptical or other non-circular cross-section. Alternatively, the outer surface may be elliptical and the inner surface circular, or some other combination. More generally, a sleeve may be considered to be a generalized hollow cylinder with one or more radii or varying cross-sectional profiles along the axial length of the cylinder.

A "tubular" is used herein to include oil country tubular goods and accessory equipment such as drill string, liner hangers, casing nipples, landing nipples and cross connects associated with completion of oil and gas wells. Tubulars also include any pipe of any size or any description and is not limited to only tubular members associated with oil and gas wells. Further, the term "tubular" is not restricted to flow spaces with a cylindrical shape (i.e., with a generally circular axial cross-section), but is instead intended to encompass enclosed flow spaces of any other desired cross-sectional shape, such as rectangular, hexagonal, oval, annular, non-symmetrical, etc. In addition, the term tubular also contemplates enclosed flow spaces whose cross-sectional shape or size varies along the length of the tube.

A "well" or "wellbore" refers to holes drilled vertically, at least in part, and may also refer to holes drilled with deviated, highly deviated, and/or horizontal sections of the wellbore. The term also includes wellhead equipment, surface casing, intermediate casing, and the like, typically associated with oil and gas wells.

Overview

Disclosed is are systems and methods for managing subterranean drill bits to provide improved bit life, reduced bit failure risk, and identify and address issues related to bit wear, damage, and/or failure. A key part of the disclosure related to improved consistency and accuracy with bit analysis, assessment, and characterization (collectively, classification techniques). The examples described herein generally relate to two classification techniques that can be utilized individually or in combination to characterize drill bit and BHA damage automatically: (i) a neural network technique or (ii) statistical techniques, combining image pre-processing, feature extraction, edge detection, and statistical models. Automated drill bit and BHA diagnosis enables interpretation of real-time data and diagnosing drilling limiters. An automated decision support system can enable more widespread adoption of bit forensics practices due to reduction in training, skill, and time required to identify and diagnose drill bit and BHA damage.

In some examples, an automated decision support system can also improve repeatability of drill bit and BHA damage diagnosis and enable further data analytics to interpret real-time data using the diagnosis. This correlation can improve real-time diagnosis of downhole dysfunction from surface data and improve drilling practices.

FIG. 1 is an illustration of a system for downhole drilling. The system 100 includes a drill string 102 operating in a wellbore 104. The drill string 102 can be operatively coupled to a drilling rig 106 configured to rotate, push, and pull the drill string 102. The drill string 102 can include a drill bit 108 and a multiple segments of drill string, or joints, 110 that can be removed and replaced. Stabilizers 112, placed along the drill string 102, can keep the drill bit 108 in line with the wellbore 104, preventing undesirable deviations and also reducing the contact area between the drill string and the wellbore. The drilling rig 106 can operate the drill string 102 from the top of a surface 114. The wellbore 104 formed is a hole cutting through overburden 116 into a reservoir 118.

Figure 2:
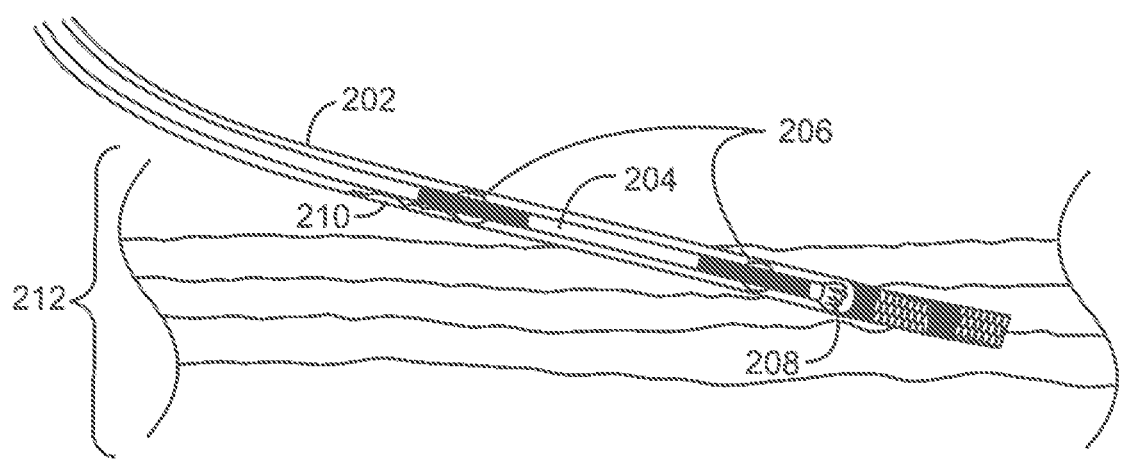
FIG. 2 is an illustration of items that may cause damage to drill bits or stabilizers.

FIG. 2 is an illustration of a drill string in a wellbore showing items that may cause damage to drill bits or stabilizers. The drill string 200 can operate in a wellbore 202, and may be composed of alternating segments of drill pipe, drill collars 204, stabilizers 206, and a drill bit 208. The stabilizers 206 can help keep the drill string in place during drilling operation.

The drill bit 208 is configured to drill the wellbore 202. The drill collars 204 may be heavy, thick-walled sections of the drill string 200 that provide weight to the drill bit 208. Obstructions 210 in the wellbore that can damage the drill bits 208 may include loose or unstable formations, rock cuttings that remain after drilling, or broken remains from previous drill bits. Additionally, alternating layers of hard and soft material 212 in the rock formation can damage the drill bit 208 as the drill bit drills through the rock formation. Different types of damage to drill bits are described in greater detail below in relation to FIGS. 10, 11, 12A, 12B, 12C, 13, 14, and 15. Additionally, techniques for identifying causes of the different types of damage to drill bits are described herein in relation to FIGS. 6A, 6B, and 8.

Figure 3:
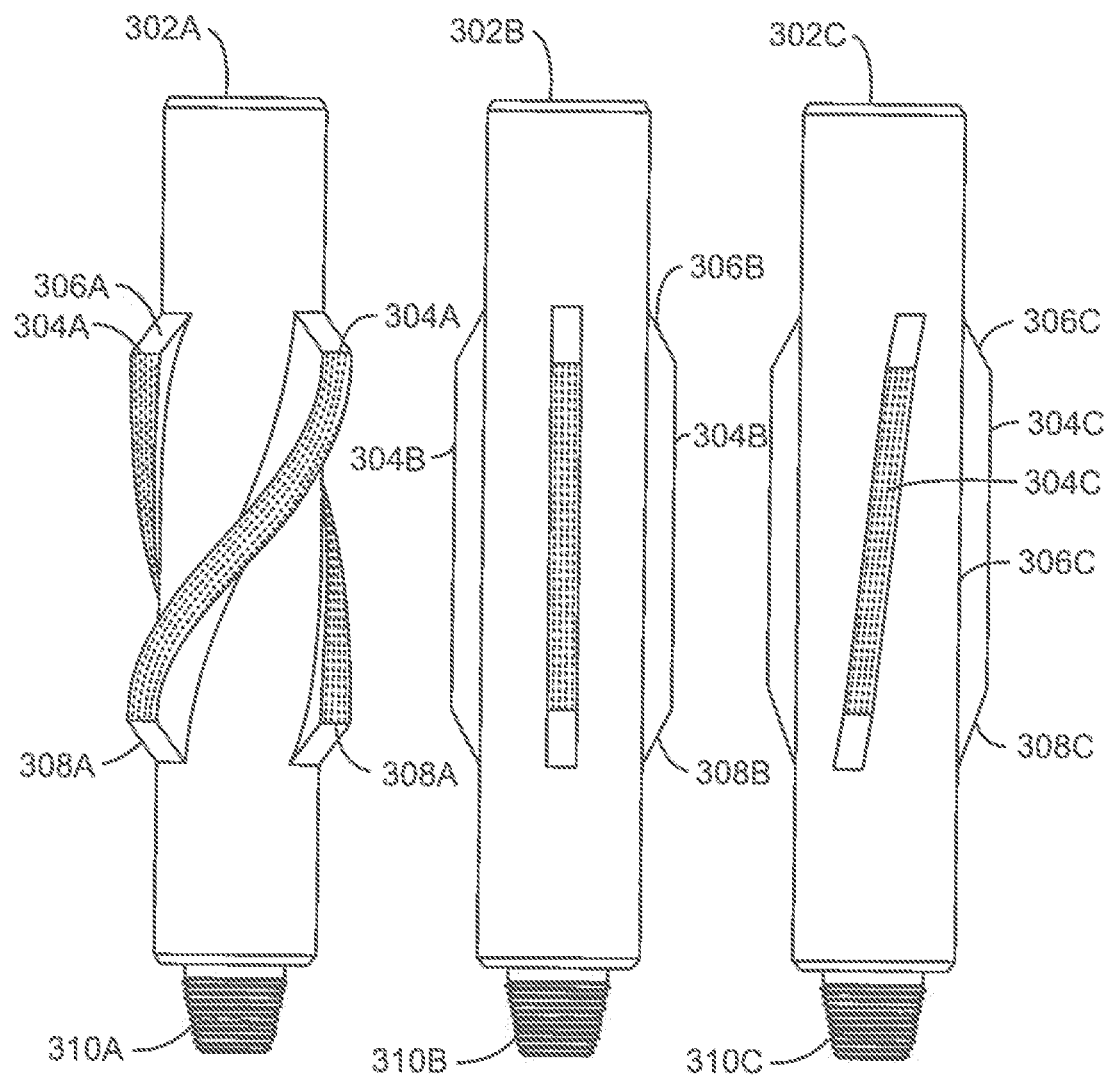
FIGS. 3A, 3B, and 3C are perspective views of four-blade stabilizers with different blade configurations.

FIGS. 3A, 3B, and 3C are side views of four-blade stabilizers with blades. It may be noted that the four blade stabilizers are merely one example of stabilizers that may be used. Stabilizers may have fewer or more blades, and may be attached in different configurations. The four-blade stabilizers described below in relation to FIGS. 3A, 3B, and 3C, depict different stabilizer blades that can be recognized with neural networks as described below in relation to FIGS. 6A, 6B, and 8. In some examples, identifying the different stabilizer blades can enable a neural network to identify a cause of damage to a stabilizer based on a direction of force that caused the damage.

In FIG. 3A, the four-blade stabilizer 300A can have a stabilizer body 302A with four one-piece stabilizer blades 304A, each attached to the stabilizer body 302A. In some examples, each blade 304A can be formed with any suitable angle. For example, a top portion 306A of the blade 304A can attach to the stabilizer body 302A at a different vertical position than a bottom portion 308A of the blade 304A. In some examples, the blade 304A form an angle wrapping around the stabilizer body 302A in a clockwise or counterclockwise direction. In some examples, the top portion 306A of the blade 304A and the bottom portion 308A of the blade 304A can attach to the stabilizer body 302A at any suitable fixed horizontal or vertical locations.

In FIG. 3B, the four-blade stabilizer 300B can have a stabilizer body 302B with four one-piece stabilizer blades 304B, each attached to the stabilizer body 302B. In some examples, each blade 304B can be formed with straight or linear edges. For example, a top portion 306B of the blade 304B can attach to the stabilizer body 302B at the same vertical position as a bottom portion 308B of the blade 304B. In some examples, the blade 304B form a straight or linear edge along the stabilizer body 302B. For example, the blade 304B can be attached to the stabilizer body 302B at a perpendicular or ninety degree angle to the drill string connector 310B described below. In many examples the stabilizer blade 304B is a one-piece element, but in other examples the stabilizer blade 304B may comprise two or more integrated or cooperating elements.

In FIG. 3C, the four-blade stabilizer 300C can have a stabilizer body 302C with four one-piece stabilizer blades 304C, each attached to the stabilizer body 302C. In some examples, each blade 304C can be formed with straight or linear edges. In some examples, a top portion 306C of the blade 304C attaches to the stabilizer body 302C at a different vertical position than a bottom portion 308C of the blade 304C. In some examples, the blade 304C can form a straight or linear edge along the stabilizer body 302C. For example, the blade 304C can be attached to the stabilizer body 302C at a non-perpendicular angle or angle greater than or less than ninety degrees in relation to the drill string connector 310C described below. In some examples, the stabilizer blade 304C is a one-piece element, but in other examples the stabilizer blade 304C may comprise two or more integrated or cooperating elements.

The four-blade stabilizers 300A can be inserted into a drill string by a drill string connector 310A, which can be a conventional pin or box thread. The drill string connector 310A may point towards the drill bit of the drill string. In many examples the stabilizer blade 304A is a one-piece element, but in other examples the stabilizer blade 304A may comprise two or more integrated or cooperating elements. Similarly, four-blade stabilizers 300B and 300C can be inserted into drill string connections 310B and 310C.

Figure 4:
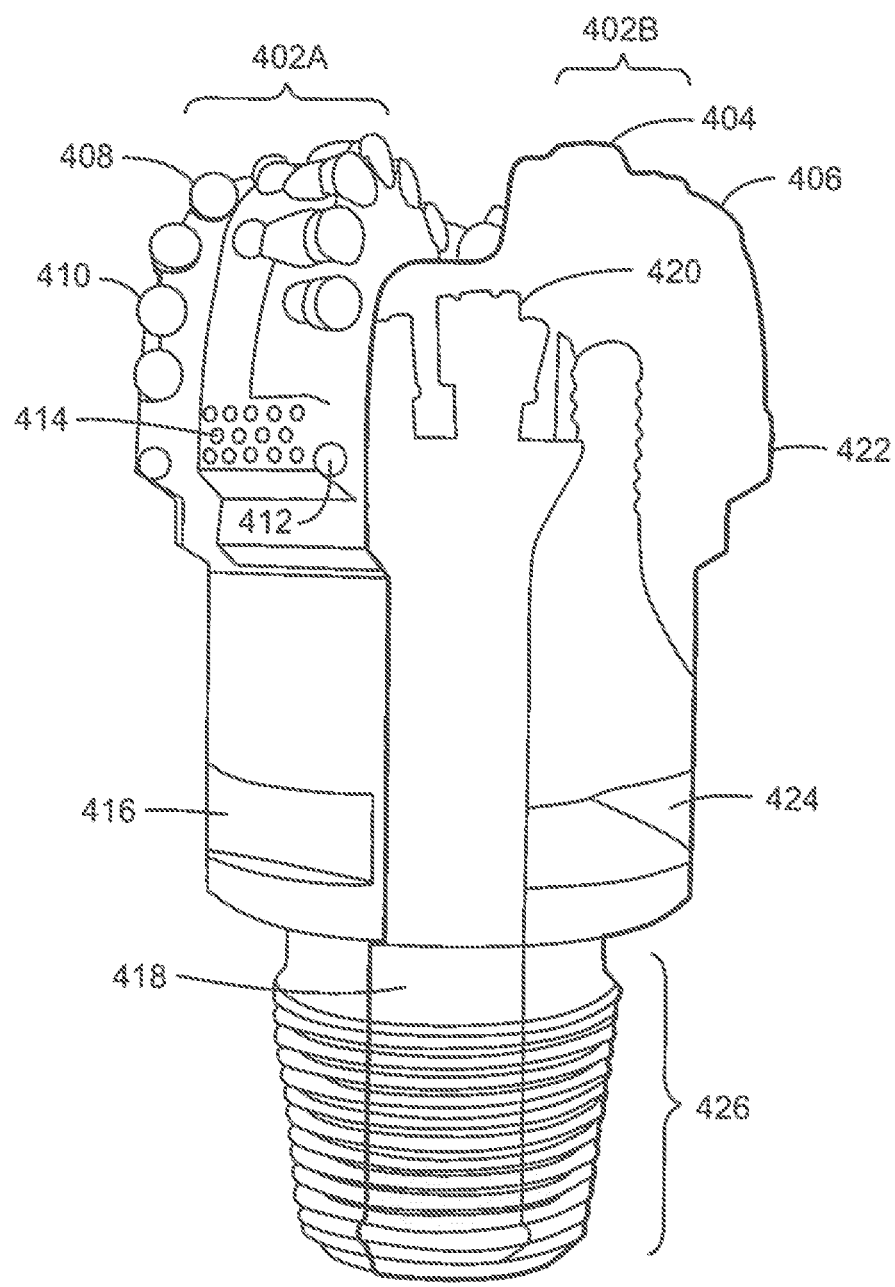
FIG. 4 is a perspective view of a drill bit.

FIG. 4 illustrates an example drill bit. In some examples, the drill bit 400 can include a tricone bit, a polycrystalline diamond compact (PDC) bit, a multiple tricone bit, and the like. The drill bit 400 can include one or more cones 402A and 402B, a nose 404, and a shoulder 406. The cones 402A and 402B can protrude from the drill bit 400 and include any number of cutters to assist with crushing, scraping, and grinding rock at the bottom of a well during the drilling process. The nose 404 can refer to a leading edge of the cones 402A and 402B that removes material from a bottom of a wellbore, while the shoulder 406 can remove material from a side of a wellbore. In some examples, the cones 402A and 402B can include a face cutter 408, a gauge cutter 410, and a back reaming cutter 412. The face cutter 408, gauge cutter 410, and back reaming cutter 412 can be placed with a particular geometry, density, and orientation within each cone 402A and 402B based on predetermined characteristics corresponding to a reservoir. For example, the face cutter 408, gauge cutter 410, and back reaming cutter 412 can be placed in the cones 402A and 402B to increase a cleaning efficiency, increase a bit aggressiveness, and prolong cutter life. In some examples, the face cutter 408, gauge cutter 410, and back reaming cutter 412 are placed in the drill bit 400 at a back rake angle to cause cuttings to curl away from a cutting element and reduce a tendency for cuttings to stick to a face of the drill bit 400. The drill bit 400 can also include a gauge insert 414, which can be constructed of a harder, more wear-resistant material, such as tungsten carbide, which can withstand severe abrasive wear.

The drill bit 400 can also include a breaker slot 416, a shank bore 418, an interchangeable nozzle 420, a gauge pad 422, a weld groove 424, and an API pin connection 426. The breaker slot 416 can enable restraining the drill bit 400 from rotation with a spanner or drill stem wrench. For example, if the drill bit 400 is to be detached from a drill string, a wrench can attach to the drill bit 400 via the breaker slot 416 to prevent rotation. In some examples, the shank bore 418 can attach to the interchangeable nozzle 420, which can include an opening for drilling fluid to exit the drill bit 400 into the bottom of a wellbore. In some examples, the gauge pad 422 can reinforce the drill bit 400 to resist against impacts caused by direct contacts with walls of a wellbore. The API pin connection 426 can attach the drill bit 400 to a drill string.

Figure 5A:
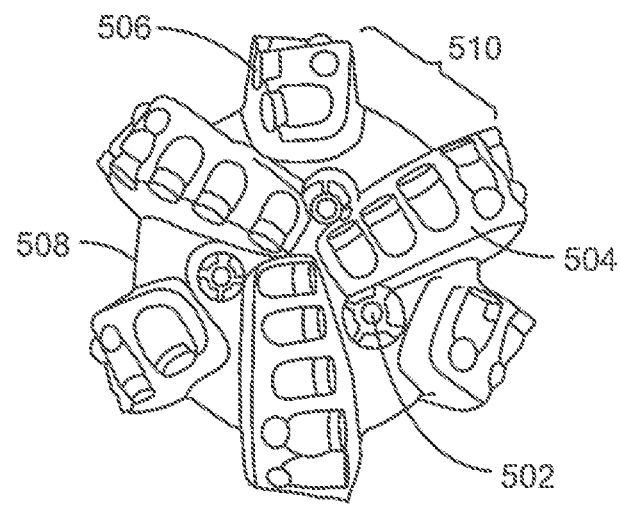
FIGS. 5A and 5B are perspective views of drill bit configurations.

FIG. 5A is an example drill bit 500A. The drill bit 500A can include any number of interchangeable nozzles 502, blades 504, and cutters 506. In some examples, the cutters 506 are PDC cutters, or any other suitable cutters, which are integrated into blades 504. In some examples, the interchangeable nozzles 502 can release drilling fluid, which can be dispersed around the drill bit 500A via the fluid course 508. In some examples, the cutters 506 can remove cuttings or material from a bottom of a bore hole and the cutting can pass through the junk slot 510. In some examples, the drill bit 500A can include any suitable number of blades, cutters, and interchangeable nozzles.

Figure 5B:
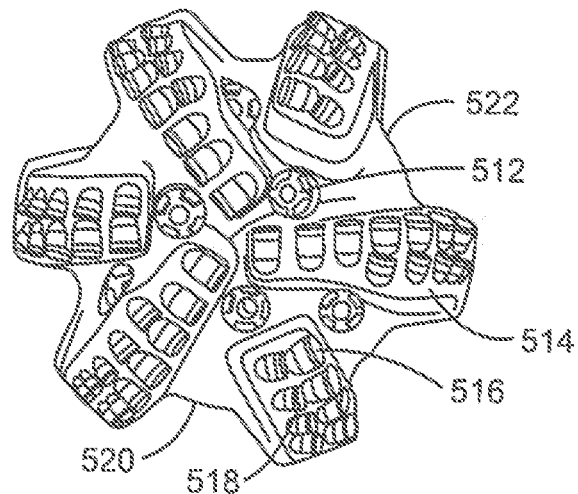

FIG. 5B is an example drill bit 500B. The drill bit 500B can include any number of interchangeable nozzles 512, blades 514, and cutters. In some examples, each blade 514 includes primary cutters 516 and backup cutters 518. The primary cutters 516 and the backup cutters 518 can be positioned on each blade 514 with a different orientation, geometry, and the like. For example, the primary cutters 516 and the backup cutters 518 can be oriented at different angles with respect to a blade 514. In some examples, each blade 514 includes a different number of primary cutters 516 and backup cutters 518. In some examples, the primary cutters 516 and backup cutters 518 can be PDC cutters, or any other suitable cutters. In some examples, the interchangeable nozzles 512 can release drilling fluid, which can be dispersed around the drill bit 500B via the fluid course 520. In some examples, the primary cutters 516 and backup cutters 518 can remove cuttings or material from a bottom of a bore hole and the cutting can pass through the junk slot 522. In some examples, the drill bit 500B can include any suitable number of blades, cutters, and interchangeable nozzles.

Figure 6A:
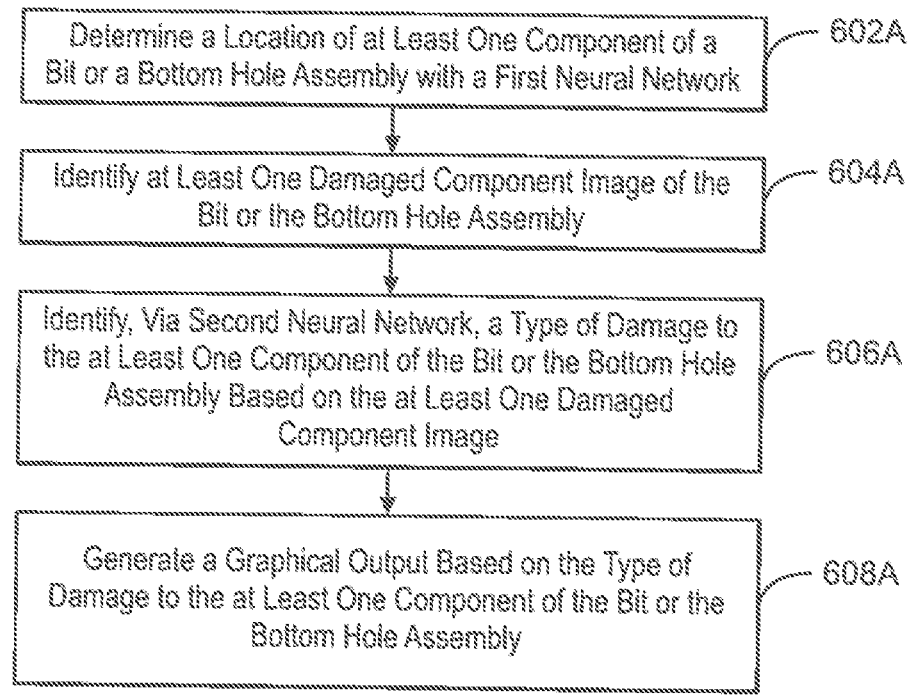
FIGS. 6A and 6B are example process flow diagrams for identifying damage to drill bits and bottom hole assemblies with neural networks.
Figure 6B:
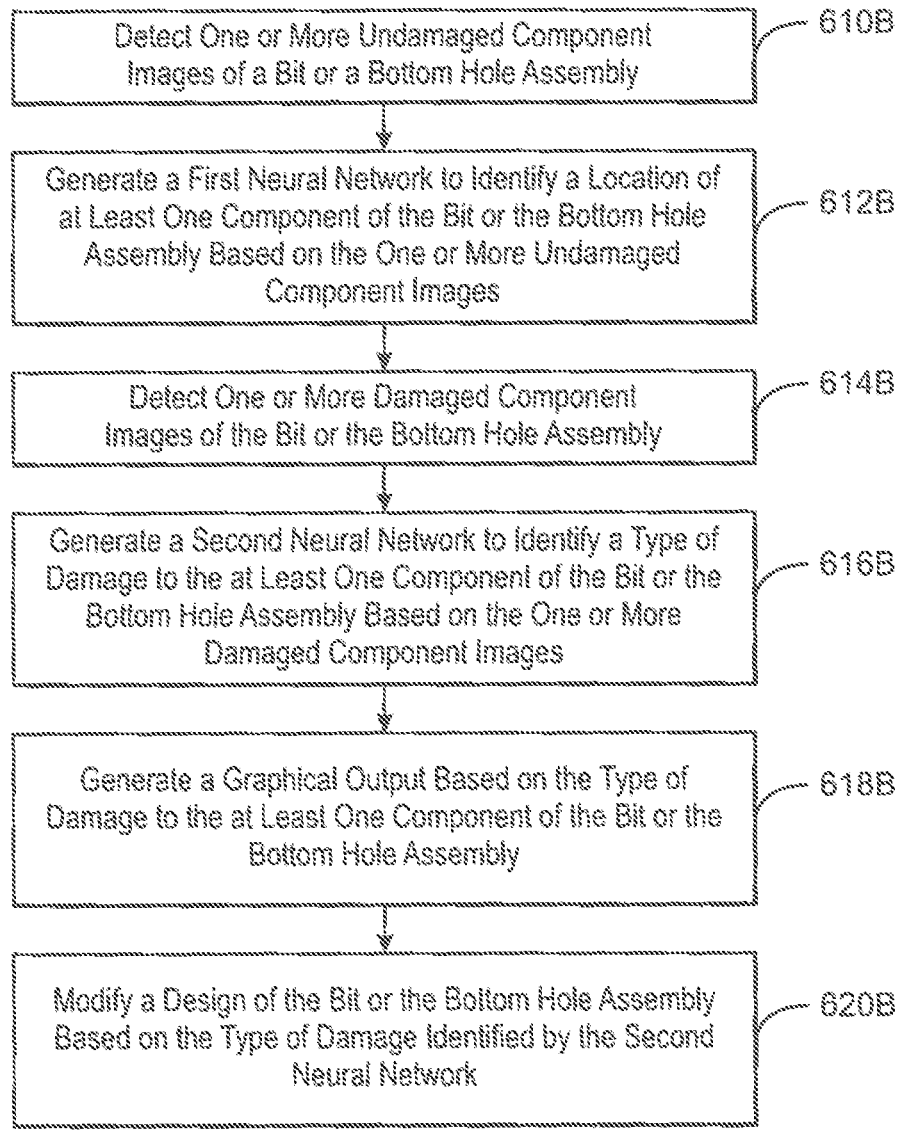

FIGS. 6A and 6B are example process flow diagrams for identifying damage to drill bits and bottom hole assemblies with neural networks. The methods 600A and 600B can be implemented with any suitable device, such as the cluster computing system 1700 of FIG. 17 described below.

At block 602A of FIG. 6A, a device can determine a location of at least one component of a bit or a bottom hole assembly with a first neural network. For example, the device can determine a location of a cutter, a blade, a cone, a shoulder, a stabilizer, or any other suitable component of a drill bit or bottom hole assembly. In some examples, the location of the component is determined with a neural network that is trained based on images of undamaged components. Training a neural network is described in greater detail below in relation to FIG. 6B.

At block 604A, a device can identify at least one damaged component image of the bit or the bottom hole assembly, wherein the at least one damaged component image is detected in response to drilling a wellbore with a drill string comprising the bit or the bottom hole assembly within a subsurface region. In some examples, the damaged component image can depict a drill bit or bottom hole assembly from any suitable angle or distance. The damaged component image can indicate a damaged component, a missing component, or ordinary wear of a component.

At block 606A, a device can identify, via a second neural network, a type of damage to the at least one component of the bit or the bottom hole assembly based on the at least one damaged component image. In some examples, the type of damage can include any type of damage to a drill bit or bottom hole assembly such as whirl or lateral damage to a shoulder of a drill bit, axial or tag bottom damage to a nose of a drill bit, or stick-slip damage to a cone of a drill bit, among others. The type of damage can be identified with a second neural network that is trained based on images of damaged components as discussed in greater detail below in relation to FIG. 6B.

At block 608A, a device can generate a graphical output based on the type of damage to the at least one component of the bit or the bottom hole assembly. For example, the device can generate any suitable graphical interface output indicating a location of damage to a component, an orientation of the damage to the component, and an extent of the damage to the component, and the like. In some examples, the graphical interface output includes damage to each of the components of a drill bit or BHA in a three dimensional image, a series of two dimensional images, and the like.

In FIG. 6B, at block 610B, a device can detect one or more undamaged component images of a bit or a bottom hole assembly (BHA). In some examples, the undamaged component images of a bit of BHA are captured using any suitable imaging device, such as a camera, among others, before the bit or BHA is used for drilling. In some examples, the device captures a separate image of each component or feature to be monitored for a drill bit or BHA. For example, the device can capture a separate image for each blade, cone, portion of a gauge pad, set of cutters, and the like. In some examples, the bottom hole assembly includes a drill bit, which is used to break up the rock formations. The bottom hole assembly can also include drill collars, which are heavy, thick-walled tubes used to apply weight to the drill bit. Furthermore, the bottom hole assembly can include drilling stabilizers, which keep the assembly centered in the hole. The BHA may also contain other components such as a downhole motor and rotary steerable system, measurement while drilling (MWD), and logging while drilling (LWD) tools. In some examples, the components are joined together using rugged threaded connections and short "subs" to connect components with dissimilar threads.

At block 612B, the device can generate a first neural network to identify a location of at least one component of the bit or the bottom hole assembly based on the one or more undamaged component images. For example, the device can generate a neural network with an input layer, any number of hidden layers, and an output layer. The input layer of the first neural network can include the undamaged component images. In some examples, the first neural network can identify components of a drill bit or BHA from the undamaged component images. For example, the first neural network can identify cutters, blades, cones, gauge pads, and the like. The first neural network can also identify any number of stabilizers from a drill string. In some examples, the first neural network can identify locations of components of a drill bit or BHA following a pre-processing of the undamaged component images. The pre-processing techniques are described in greater detail below in relation to FIG. 8.

In some examples, the device generates the first neural network by training the first neural network with components manually labeled in images of undamaged components. For example, the device can detect a set of labeled images, which identify locations and features corresponding to components of a drill bit or BHA. The device can train the first neural network to recognize the components of the drill bit or BHA based on the features corresponding to each component in the set of labeled images.

In some examples, the first neural network is a convolutional neural network with a feed-forward network comprised of any suitable number of convolutional layers. In some examples, at least two of the convolutional layers are fully connected. The first neural network can also include any number of pooling layers, which combine the outputs of multiple neuron clusters at one layer into a single neuron in a subsequent layer. In some examples, the pooling layer utilizes a max pooling technique that relies on a maximum value from each cluster of neurons at a previous layer.

At block 614B, the device can detect one or more damaged component images of the bit or the bottom hole assembly. In some examples, the damaged component images are detected in response to drilling a wellbore with a drill string comprising the bit or the bottom hole assembly within a subsurface region. For example, the damaged component images can be detected by a camera or any other suitable imaging device following the removal of the drill bit or BHA from the wellbore. In some examples, the damaged component images are captured from any suitable number of predetermined angles to detect damage to the drill bit or BHA. For example, the damaged component images can include images of cutters or blades from any suitable angle, images of a stabilizer from any suitable angle, images of a gauge pad from any suitable angle, and the like. As discussed below in relation to FIG. 8, the damaged component images can also include pre-processed images to normalize a scale of the components in the images, adjust for differences in lighting, and the like.

At block 616B, the device can generate a second neural network to identify a type of damage to the at least one component of the bit or the bottom hole assembly based on the one or more damaged component images. In some examples, the second neural network can identify a type of damage to a component of a drill bit or BHA based on an extent or classification of damage to the component, an orientation of the damage to the component, a location of the component, and damage to adjacent components, among others. For example, the classified damage can include any suitable scale of damage such as none, low, medium, and high, or any suitable numerical scale, among others. In some examples, the type of damage indicates an amount of bit wear or an amount of bottom hole assembly wear below a predetermined threshold level, wherein the predetermined threshold level indicates whether the component is damaged or has experienced ordinary wear. The orientation of the damage to the component can include no damage, circumferential damage, or axial damage, among others. In some examples, the second neural network detects any suitable type of damage such as whirl or lateral damage to a shoulder of a drill bit, axial or tag bottom damage to a nose of a drill bit, or stick-slip damage to a cone of a drill bit, among others.

In some examples, the location of the component and damage to adjacent components enable the second neural network to identify damage to cutters and other components of the drill bit or BHA. For example, the second neural network can identify stick-slip damage to cutters if the cutters are located in a predetermined location of a blade of a drill bit. In some examples, the second neural network can also identify axial vibration or bit bounce, and lateral vibration or bit whirl based on a location of the damaged cutters and locations of adjacent damaged cutters.

In some examples, the second neural network extracts a feature from a set of processed damaged component images, wherein the extracted feature indicates a cause of the type of damage to the bit or the bottom hole assembly. As discussed below in relation to FIG. 8, extracting the feature can include performing edge detection on the set of processed damaged component images. In some examples, extracting the feature comprises identifying the feature based on a statistical measurement from the set of processed damaged component images.

In some examples, the device can generate the second neural network by training the second neural network with components manually labeled in images of damaged components. For example, the device can detect a set of labeled images, which identify types of damage corresponding to components of a drill bit or BHA. The device can train the second neural network to recognize the damage to the components of the drill bit or BHA based on the damage characteristics corresponding to each component in the set of labeled images. The damage characteristics can include the classified damage to the component, orientation of the component, location of the component, and damage to adjacent components, as discussed above.

At block 618B, the device can generate a graphical output based on the type of damage to the at least one component of the bit or the bottom hole assembly. For example, the device can generate any suitable graphical interface output indicating a location of damage to a component, an orientation of the damage to the component, and an extent of the damage to the component, and the like. In some examples, the graphical interface output can include damage to each of the components of a drill bit or BHA in a single image.

At block 620B, the device can recommend a modification of a design of the bit or the bottom hole assembly based on the type of damage identified by the second neural network. For example, a drill bit can be selected that has a decreased or increased taper gauge size, a modified depth of cut (DOC) limiter, a modified gauge edge chamfer, a modified hardfacing and TSP placement, an extra gauge cutter, a modified backrake, or a modified TCC setting, among others.

In some examples, the blocks of methods 600A and 600B can be executed in alternate orders. Furthermore, the methods 600A and 600B can include any suitable number of fewer or additional blocks.

Figure 7A:
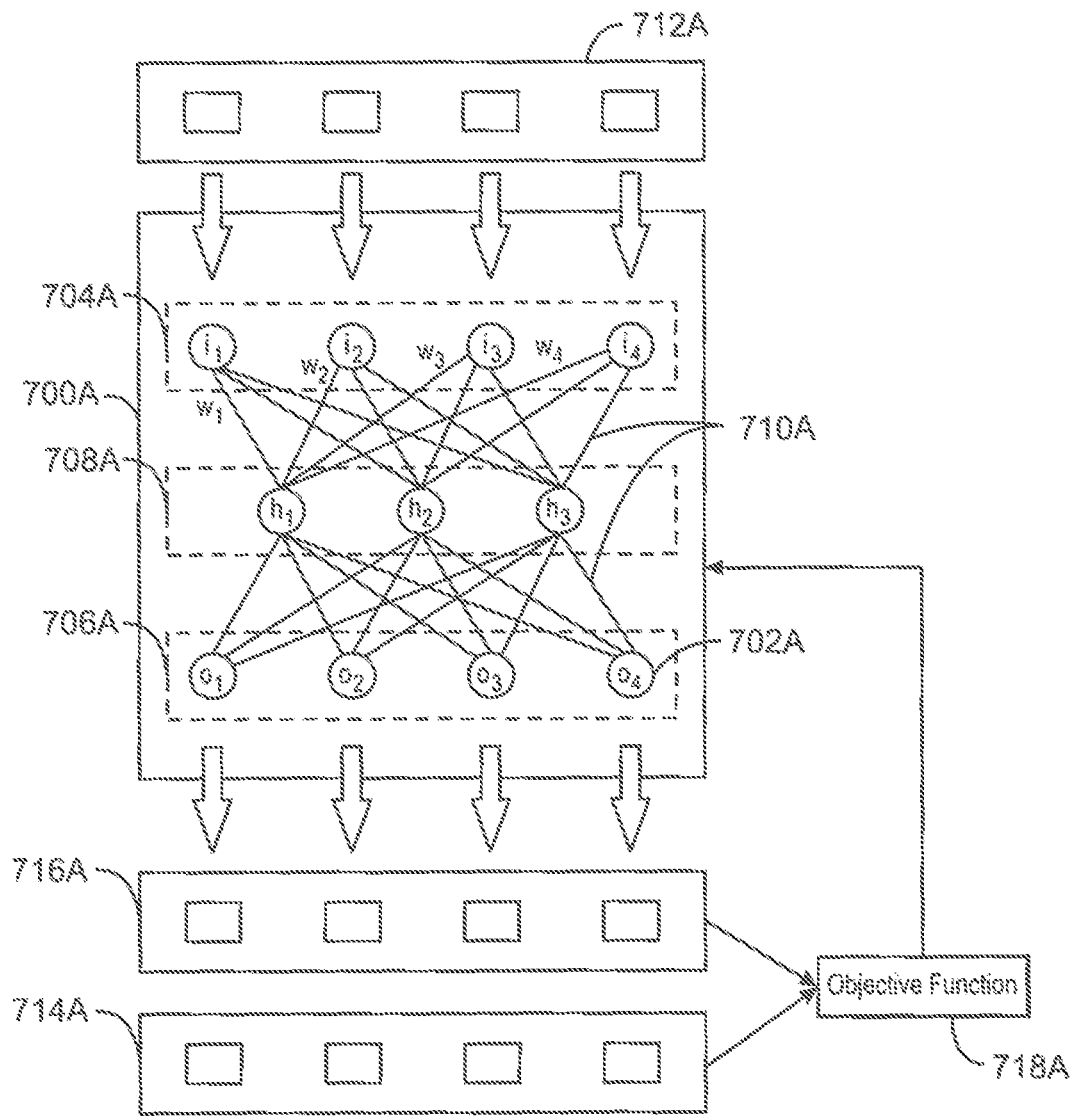
FIG. 7A is an example block diagram depicting a neural network for identifying damage to drill bits and bottom hole assemblies.

FIG. 7A is a schematic view of an example neural net 700A that may be used in examples of the present techniques. The neural net 700A may include a network of nodes 702A. The neural net 700A may include an input layer 704A, an output layer 706A and one or more hidden layers 708A. Each node 702A in a layer may be connected to the nodes 702A of a preceding layer by a connection 710A characterized by a weighting value, w. The value computed for any given node may be a function of the values at each connected node in the preceding layer modified by the weighting values, w. For example, the node labeled "$h_1$" may be computed by the formula shown in Eqn. 1.

$$h_1 = f(w_1 i_1 + w_2 i_2 + w_3 i_3 + w_4 i_4) \qquad \text{Eqn. 1}$$

A training set including a set of inputs 712A and a set of desired outputs 714A may be used to train the neural net 700A, e.g., to set the values of the weights. A set of inputs 712A may be fed into the input layer 704A of the neural net 700A. Node values may then be computed for each node in the hidden layer 708A. If the neural net includes more than one hidden layer 708A, node values are successively computed for each subsequent hidden layer 708A. Node values are then computed for the output layer 706A to generate a set of outputs 716A of the neural net. The set of outputs 716A may be compared to a desired output set 714A to determine a measure of the deviation, sometimes referred to as an "objective function" 718A or "cost function," between the set of computed outputs 716A and the desired output set 714A. The desired output set 714A may be generated by a comparison to labeled training data or based on measured characteristics of the system. The objective function 718A computed for one iteration of the neural net computation may be used to alter the weighting values applied to each of the node connections 710A for the next iteration of the neural net computation. The neural net may be iteratively computed and the calculation of the objective function 718A repeated until the objective function 718A is below an acceptable threshold. After the last iteration of the neural net, the weight values correspond to an approximation of the response function of the system under consideration. The weight values may be extracted and used to identify a type of damage to a drill bit or bottom hole assembly, as discussed with respect to FIG. 8, below.

It will be appreciated that the example neural net described herein is used to introduce concepts of machine learning. In actual practice, the neural net may be any suitable neural net, such as a convolutional neural network, including any number of hidden layers 708A and any number of nodes 702A per layer, as well as any other proper topology of neuron connections. Further, it will be appreciated that examples may include other supervised machine learning techniques, such as probabilistic trees, support vector machines, radial basis functions, and other machine learning techniques.

Figure 7B:
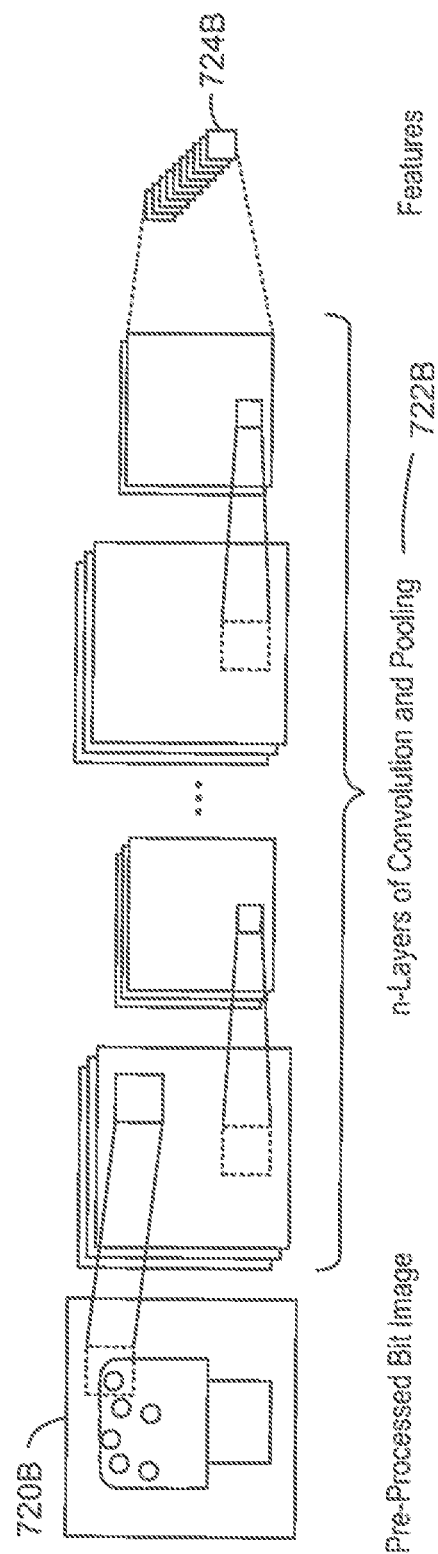
FIG. 7B is a schematic view of an example convolutional neural network for identifying damage to drill bits and bottom hole assemblies.

FIG. 7B is a schematic view of an example convolutional neural network that can be used in examples of the present techniques. The neural net can detect a pre-processed bit image 720B of a damaged drill bit or bottom hole assembly. In some examples, the pre-processed bit image 720B is combined with any number of additional images to train the neural net 700B. The neural net can include any suitable number of layers for convolution and pooling 722B. Each layer can identify a portion of the pre-processed bit image 720B to analyze for features. In some examples, any number of convolutional layers are fully connected. In some examples, a pooling layer utilizes a max pooling technique that relies on a maximum value from each cluster of neurons at a previous layer. The neural net can identify and extract features 724B based on the layers for convolution and pooling 722B. The features 724B can enable identifying a type of damage to a drill bit or bottom hole assembly, as discussed with respect to FIG. 8, below. For example, the features 724B can classify the location, extent, types, and/or consistencies of wear across the bits or bottom hole assemblies. In some examples, the features 724B also classify causes of damage to bits or bottom hole assemblies.

It will be appreciated that the example convolutional neural net described herein is used to introduce concepts of machine learning. Further, it will be appreciated that examples may include other supervised machine learning techniques, such as probabilistic trees, support vector machines, radial basis functions, and other machine learning techniques.

Figure 8:
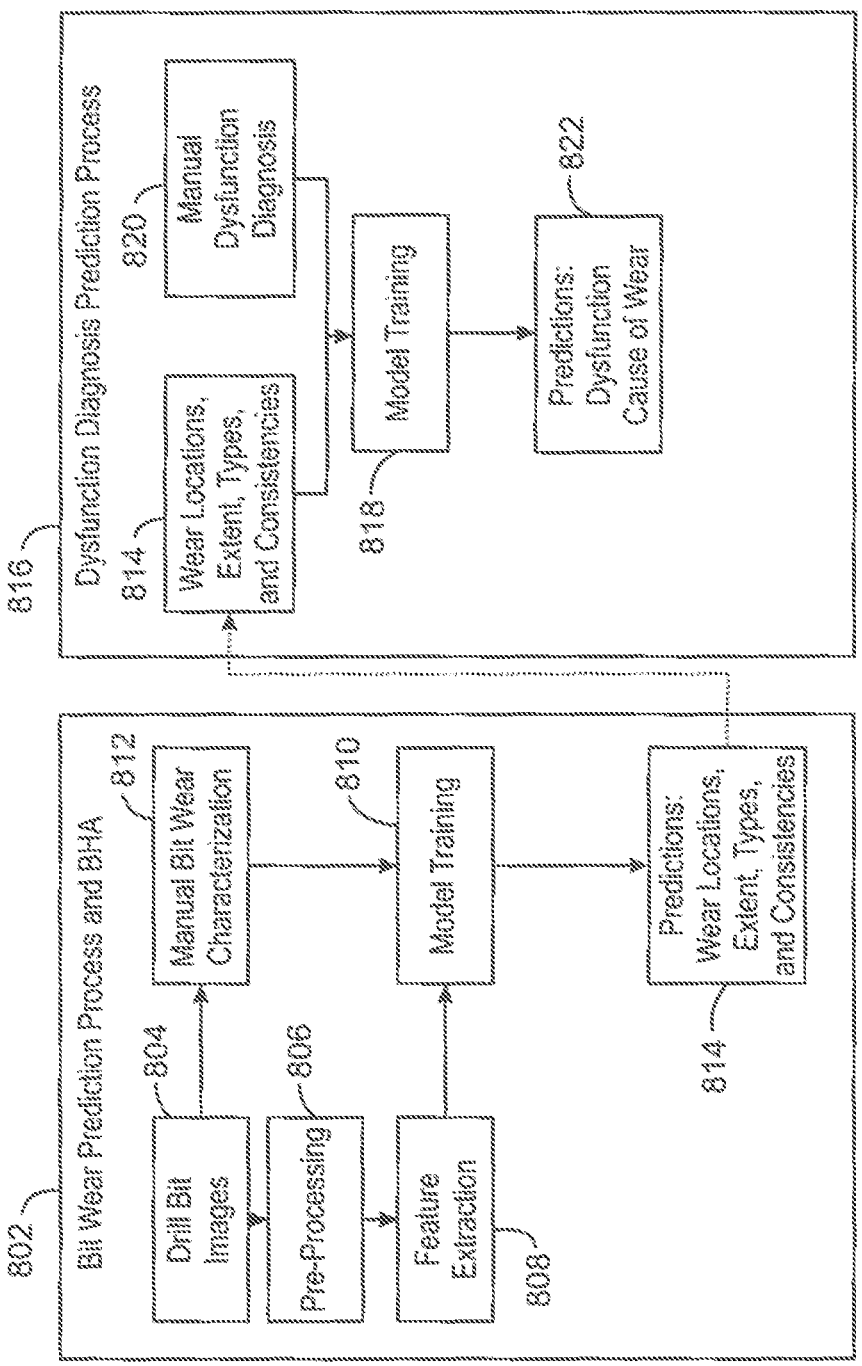
FIG. 8 is an example block diagram depicting two interconnected models that can identify damage to drill bits and bottom hole assemblies.

FIG. 8 is an example block diagram 800 depicting two interconnected models that can identify damage to drill bits and bottom hole assemblies. The models may include neural networks, support vector machines, decision trees, and the like. In some examples, neural network 802 can detect any number of drill bit images 804. For example, the neural network 802 can create a training data set of images of damaged bits and BHAs along with metadata for each bit or BHA image. The metadata can include expert diagnoses of damage patterns, directions, and locations for each feature (cutter, blade, etc.). In some examples, the neural network 802 can also pre-process the drill bit images 806. For example, the neural network 802 can preprocess images by augmenting the image data set, rescaling images, and normalizing images. Images may also be rescaled to ensure consistent feature size between images. Images may further include preprocessing to zero-center and normalize the pixel data. In some examples, the training data is augmented by producing rotated, translated, and rescaled versions of existing images. In some examples, the images are preprocessed by applying at least one modification to the one or more damaged component images, wherein the at least one modification comprises a rotation modification, a translation modification, a scaling modification, a red-green-blue (RGB) scale modification, or a hue-saturation-intensity (HSI) scale modification, among others. In some examples, generating the set of processed damaged component images comprises modifying the one or more damaged component images to be from a uniform perspective.

In some examples, the neural network 802 is trained with the pre-processed images of the drill bits and BHAs. For example, the neural network 802 can select a subset of processed images as input to identify features of components of a drill bit or BHA. The neural network 802 can also identify the relative location and number of cutters for bits, separate blades for drill bits, and a location and number of blades of each stabilizer. In some examples, the neural network 802 extracts features 808 of each drill bit and BHA component based on dedicated images for individual components of the bit or BHA. For example, images may be focused on individual blades, cutters, or other bit features. In some examples, extracting features 808 can include extracting edges and classifying according to the desired feature set, for example, cutters, blades, numeric markings, and the like.

In some examples, the neural network 802 can be trained 810 by analyzing edges of features to determine a measure of damage or missing components. For example, the neural network can classify a type of wear (e.g., regular wear or damage) and extent of wear/damage (e.g., none, low, medium, high, missing). In some examples, the neural network 802 is trained 810 in part based on manually entered 812 labels indicating bit wear characteristics. For example, the manually entered 812 labels can include information provided by professionals regarding drill bit wear to cutters, stabilizers, and the like.

In some examples, the neural network 802 detects 814 damage information such as wear locations, the extent of the wear, types of wear, and consistencies of wear. The neural network 802 can transmit the damage information to a second neural network 816 for identifying a cause of the damage. The wear location can indicate a spatial orientation and a position with respect to the bit or bottom hole assembly. The consistency can indicate whether the damage is repeated in other locations on the bit or the bottom hole assembly. The type of wear can indicate a fracture pattern of the damage to the bit or the bottom hole assembly, wherein the fracture pattern includes but is not limited to smooth wear, tangential cutter fracture, spalling, heat checking, or blade wear scars. The extent can indicate an amount of wear on the bit or an amount of wear on the bottom hole assembly below threshold levels.

The second neural network 816 can be trained 818 based on the damage information 814 and manually detected 820 dysfunction diagnosis. The trained second neural network 816 can then generate 822 an output indicating a cause of the damage or wear to a drill bit or bottom hole assembly. In some examples, the second neural network 816 can be trained to indicate a probability of a cause of damage or wear to a drill bit or a bottom hole assembly. The second neural network 816 can also provide a list of probabilities corresponding to potential causes of damage or wear to a drill bit or bottom hole assembly. In some examples, the second neural network 816 determines the probability of a cause of damage based on consistency of individual feature damage, a correlation between drill bit and BHA damage, and image classification algorithm output scores, among others. In some examples, the second neural network 816 identifies an orientation of individual feature damage within a drill bit or BHA by classifying damage based on a direction of damaging force. The orientation of feature damage can be used by the second neural network 816 to determine a probability of a cause of damage to a drill bit or BHA. In some examples, the second neural network 816 synthesizes damage classification corresponding to drill bits and bottom hole assemblies to form a list of high probability causes of damage or damage mechanisms.

In some examples, the second neural network 816 is a support vector machine, decision tree, or any suitable type of neural network such as a convolutional neural network, among others. If the second neural network 816 is a convolutional neural network, the second neural network 816 can be trained with a combination of images and extracted features from the images, as well as manual classification information provided by experts reviewing the images.

In some examples, a system can use a statistical technique to identify a cause of damage to a drill bit or BHA rather than a second neural network 816. For example, the system can predict forensics classification and diagnosis using a validated subset of images. The system can also compare actual and predicted classifications of damages components or features in an image to determine a score model accuracy. The system can iterate the statistical technique any suitable number of times until a score model accuracy is below a predetermined threshold level.

In one example, the second neural network 816 can identify damage to a stabilizer. For example, an image can indicate that stabilizer blades are worn to the stabilizer body, which indicates the jump rope motion seen with forward whirl. A drill bit photo can demonstrate shoulder cutter wear, which also indicates whirl. The second neural network 816 can combine the stabilizer damage with the drill bit damage to indicate dysfunctions occurring while drilling. In some examples, real-time data combined with pre-drill modeling can support the stabilizer and drill bit damage identified by the second neural network 816. Accordingly, the accuracy of the second neural network 816 can be increased by combining multiple images of various components of a drill string.

In some examples, a drill bit or BHA is modified based on the type of damage experienced by the drill bit or the BHA. For example, the second neural network 816 can detect that a base design of a drill bit experienced gauge hardfacing flaking and trisodium phosphate (TSP) loss on the gauge pads. Following a redesign of the drill bit based on the bit forensics observations from the second neural network 816, the drill bit can have an increased gauge length, modified gauge edge chamfer, and modified hardfacing and TSP placement. Accordingly, the redesigned drill bit may not experience hardfacing flaking or loss of TSP.

It is to be appreciated that in some examples, a single supervised learning model can implement the techniques described above in relation to the neural network 802 and the second neural network 816. The supervised learning model can include linear discriminant analysis, a support vector machine, a k-nearest neighbor technique, a random forest learning technique, or any combination thereof. In some examples, the supervised learning model can also include a scale-invariant feature transform (SIFT) technique, a histogram of gradients (HOG) technique, local binary patterns (LBP), or wavelet transforms. For example, the supervised learning model can identify a location, an extent, a type, a consistency, or any combination thereof of damage to a bit or a bottom hole assembly from an image of the bit or the bottom hole assembly. The supervised learning model can also identify a cause of the damage to the bit or the bottom hole assembly based on the image.

Figure 9A:
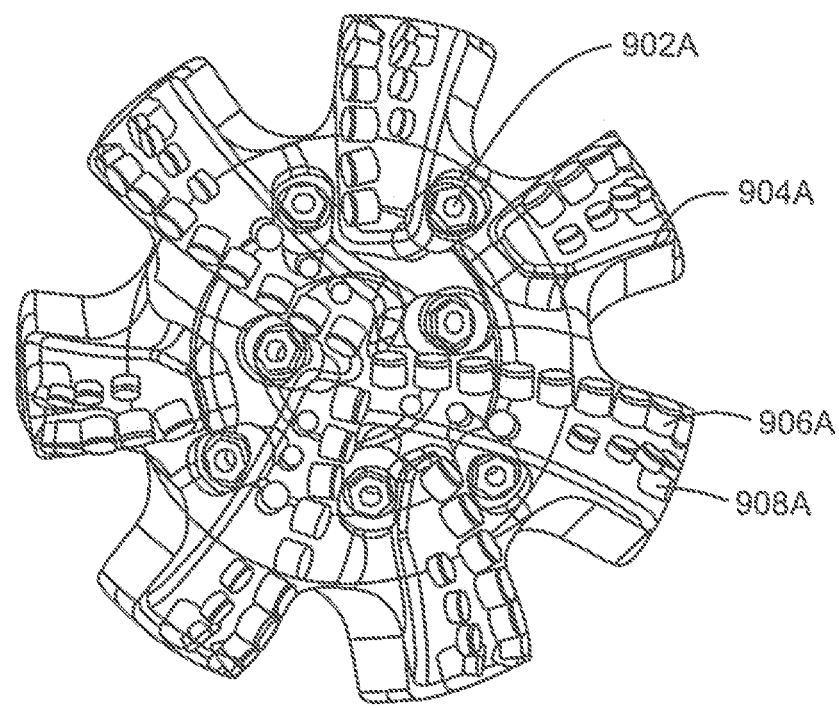
FIG. 9A is a diagram depicting a plurality of components in an undamaged drill bit identified by a neural network.

FIG. 9A is a diagram depicting a plurality of components in an undamaged drill bit identified by a neural network. In some examples, the drill bit 900A can include any suitable number of nozzles 902A for injecting drilling fluid into a borehole, blades 904A, and primary cutters 906A for removing material from a borehole. In some examples, each blade 904A can also include any number of backup cutters 908A for removing material from the borehole. In some examples, the neural network can also capture a handwritten blade number marking, which can be used to classify wear location by blade automatically. In some examples, a neural network uses an edge detection algorithm to extract edges along the bit cutters to serve as features for identifying the extent of cutter wear.

Figure 9B:
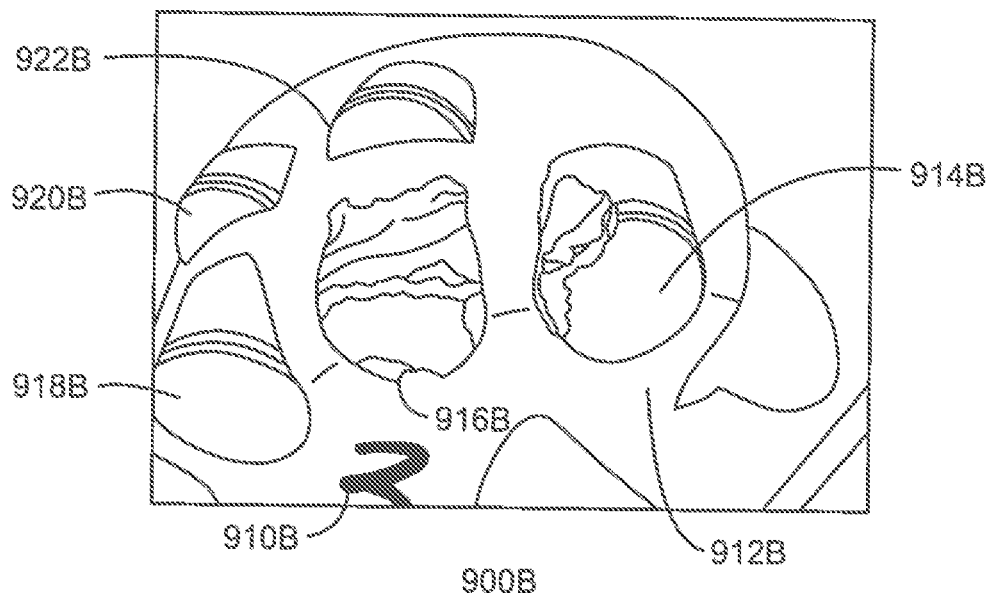
FIG. 9B is a damaged cutter of a drill bit to be analyzed with a neural network.

FIG. 9B is a damaged cutter of a drill bit 900B to be analyzed with a neural network. In some examples, the neural network can identify a marking 910B that indicates a blade 912B of the drill bit. For example, the number "2" marked on the blade 912B can indicate a location of the blade 912B on a drill bit. In some examples, the neural network identifies damage to any number of cutters of the blade 912B. For example, primary cutters 914B and 916B are damaged in FIG. 9B, while primary cutter 918B is undamaged. Additionally, the neural network can detect that the backup cutters 920B and 922B are also undamaged. The neural network can identify damage information corresponding to the primary cutters 914B and 916B such as the extent of the damage to primary cutters 914B and 916B, the location of the primary cutters 914B and 916B in relation to the blade 912B, and the damage to each of the primary cutters 914B and 916B in relation to each other. The neural network can combine the damage information regarding each of these factors to determine a cause of the damage to the primary cutters 914B and 916B.

Figure 10:
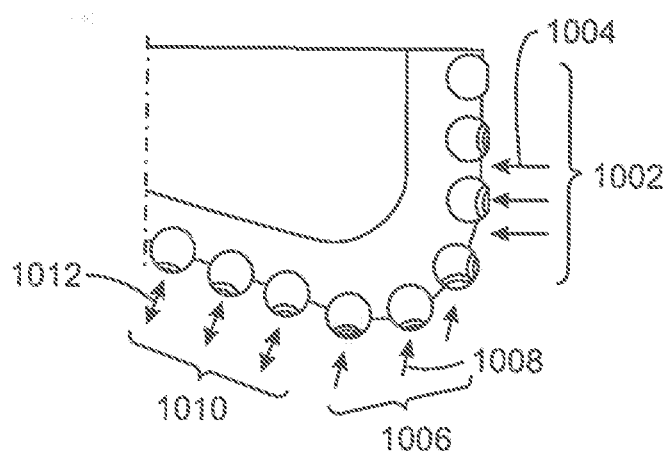
FIG. 10 is a diagram depicting categories of cutter damage in a drill bit.

FIG. 10 is a diagram depicting categories of cutter damage in a drill bit. In FIG. 10, various causes of damage to cutters of a drill bit are identified based on a direction of the damage to the cutters. In some examples, a neural network identifies damage to cutters 1002 from direction 1004. This may indicate a lateral vibration or a bit whirl. In some examples, a neural network identifies damage to cutters 1006 from direction 1008. This damage may indicate an axial vibration or bit bounce. In some examples, a neural network identifies damage to cutters 1010 from direction 1012. This damage may indicate stick-slip damage.

Figure 11:
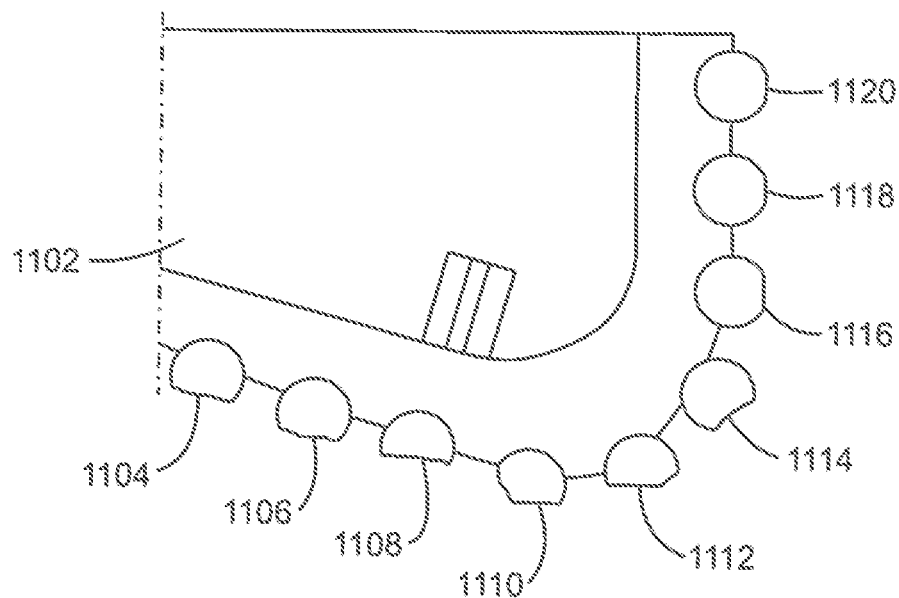
FIG. 11 is another diagram depicting categories of cutter damage in a drill bit.

FIG. 11 is another diagram depicting categories of cutter damage in a drill bit. In some examples, a blade 1102 includes any suitable number of cutters C1 1104, C2 1106, C3 1108, C4 1110, C5 1112, C6 1114, C7 1116, C8 1118, and C9 1120. In some examples, damage to cutter C1 1104 and C4 1110 can indicate a medium extent of damage with an axial orientation. The damage to cutter C2 1106 may be less extensive, which can indicate a lower extent of damage with an axial orientation. By contrast, the damage to cutter C3 1108 may be more extensive with more of the cutter missing or eroded, which indicates a higher extent of damage with an axial orientation. The axial orientation can be detected based on manually classified images depicting axial or circumferential damage.

In some examples, cutters C5 1112 and C6 1114 can indicate circumferential orientation of damage, while cutter C5 can indicate a medium extent of damage compared to the low extent of damage to cutter C6 1114. In one example, cutters C7 1116, C8 1118, and C9 1120 may not demonstrate any type of damage.

Figure 12A:
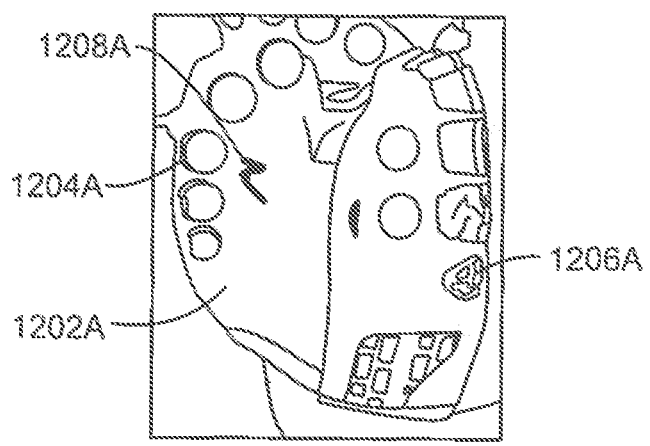
FIGS. 12A, 12B, and 12C are perspective views of damage to cutters in a drill bit.
Figure 12B:
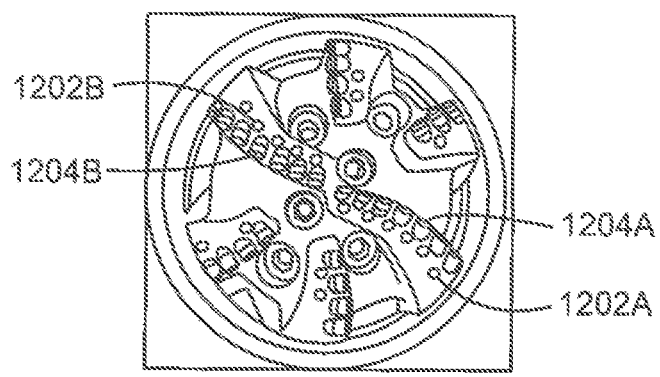
Figure 12C:
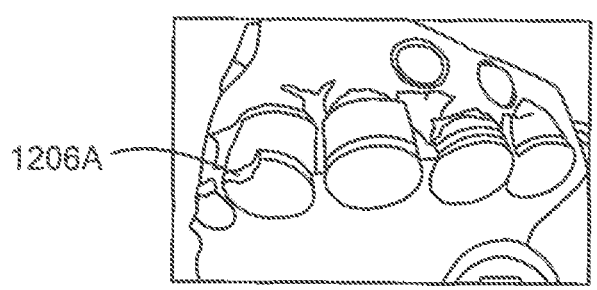

FIGS. 12A, 12B, and 12C are perspective views of damage to cutters in a drill bit. In FIG. 12A, a drill bit 1200A is depicted from a side view. The drill bit 1200A can include a blade 1202A with a number of cutters 1204A. In some examples, any of the cutter 1204A can be damaged. For example, the cutters 1206A are damaged. In some examples, a marking 1208A is visible on the blade 1202A to indicate the blade in the side view image.

In FIG. 12B, an overhead view 1200B of the drill bit 1200A is depicted. The overhead view can indicate damage to blade 1202A or blade 1202B. The overhead view can also indicate damage to any number of cutters 1204A and 1204B.

In FIG. 12C, a close-up view 1200C of cutters 1206A are depicted. The close-up view can indicate damage to cutters 1206A that is not visible from the overhead view of FIG. 12B or the side view of FIG. 12A. In some examples, a neural network can detect any suitable number of views of a drill bit, such as the side view of FIG. 12A, the overhead view of FIG. 12B, and the close-up view of FIG. 12C. The neural network can detect damage to any component of a drill bit by analyzing the blades, cutters, and other components from various images captured at different angles and distances.

Figure 13:
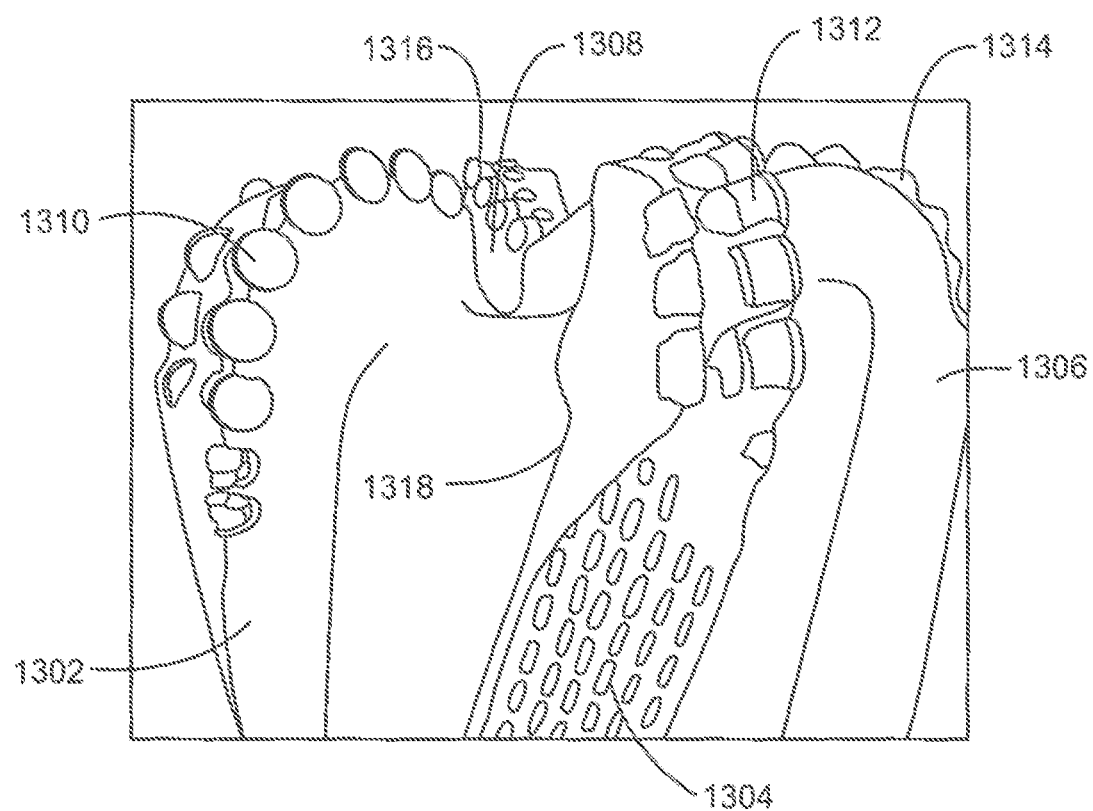
FIG. 13 is a perspective view of a drill bit with a damaged plastic hinge indicating a load direction.

FIG. 13 is a perspective view of a drill bit with a damaged plastic hinge indicating a load direction. The drill bit 1300 includes four blades 1302, 1304, 1306, and 1308. Each blade 1302, 1304, 1306, and 1308 includes a number of cutters 1310, 1312, 1314, and 1316. In some examples, a plastic hinge 1318 is located in a blade 1302, 1304, 1306, or 1308. In the event that the plastic hinge 1318 is damaged or broken, the direction of the load on the drill bit 1300 can be detected. Accordingly, a neural network can detect if a plastic hinge 1318 has been damaged and can detect a direction of a load of the drill bit 1300. The direction of the load can be used to indicate a cause of damage of the drill bit 1300. In some examples, the plastic hinge 1318 is the last surface to fail in bending of the drill bit 1300 and a fracture changes direction due to a shear failure.

Figure 14:
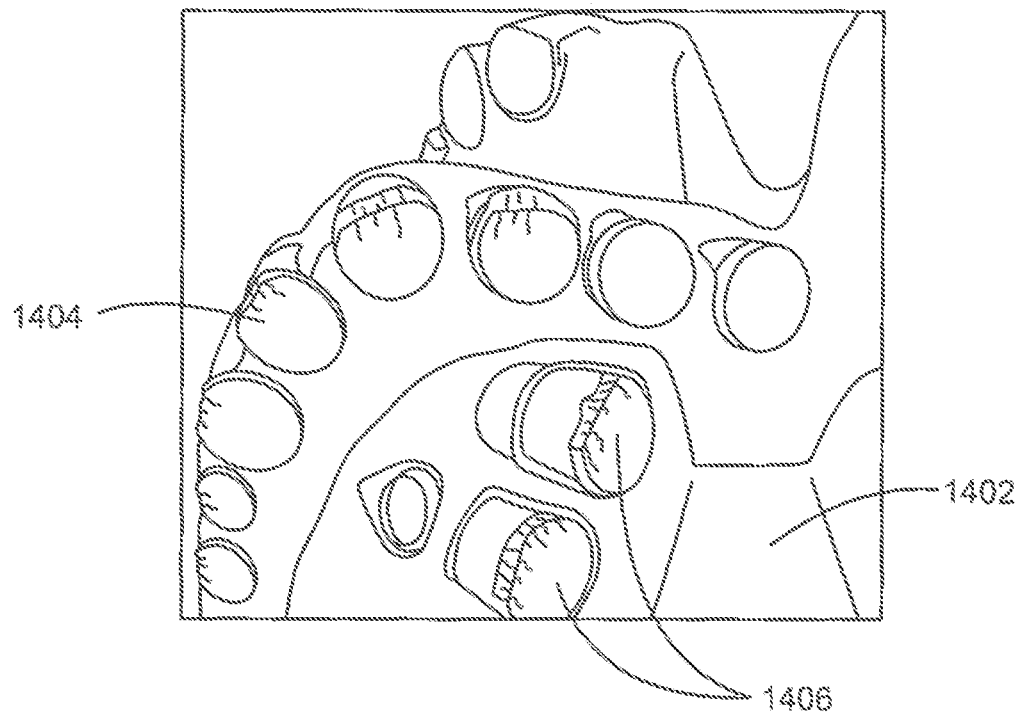
FIG. 14 is a perspective view of a drill bit with cutter damage from friction and heat.

FIG. 14 is a perspective view of a drill bit with cutter damage from friction and heat. In some examples, a drill bit 1400 can include a blade 1402 with a number of cutters 1404. In some examples, a portion of the cutters 1406 are cracked due to sliding and poor mud flow, which generates heat. Accordingly, a neural network can detect the cracking of the portion of the cutters 1406 and identify the cause of damage as excessive heat.

Figure 15:
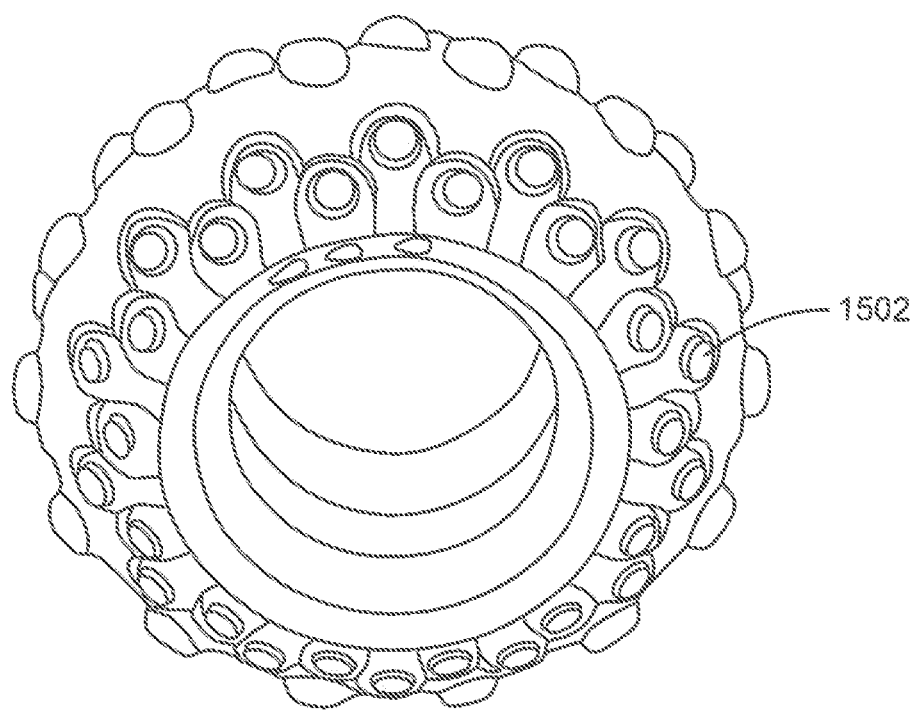
FIG. 15 is a perspective view of a drill bit with ordinary wear to cutters.

FIG. 15 is a perspective view of a drill bit with ordinary wear to cutters. In drill bit 1500, any number of cutters 1502 can be included within the drill bit 1500. In some examples, the cutters 1502 can be evenly worn during the drilling process. Accordingly, a neural network analyzing an image of cutters 1502 can determine that the smooth, even wear of the cutters 1502 indicates routine wear that is not indicative of damage to the cutters 1502 or the drill bit 1500.

Figure 16:
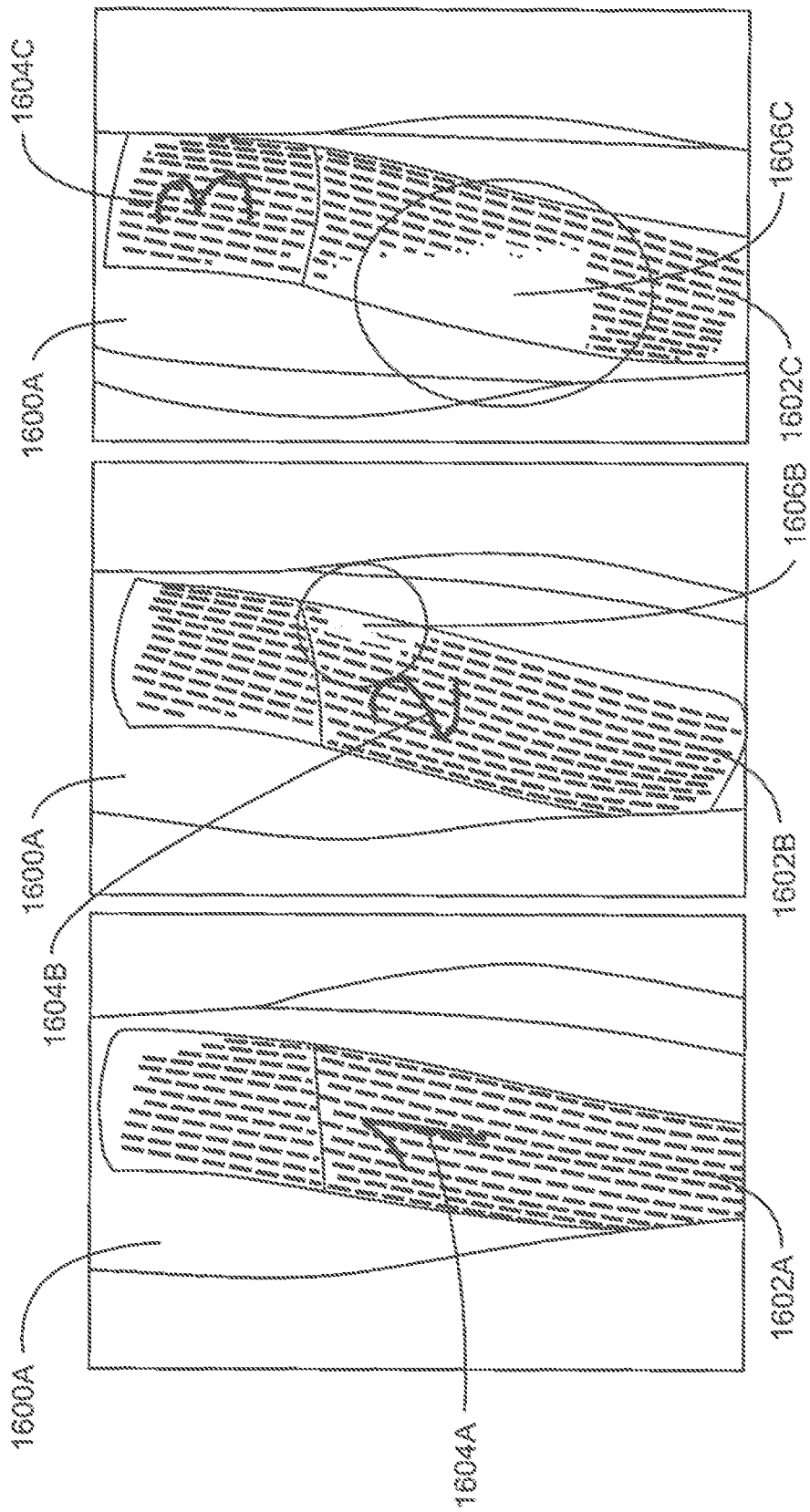
FIGS. 16A, 16B, and 16C are perspective views of damage to a stabilizer in a drill string.

FIGS. 16A, 16B, and 16C are perspective views of damage to a stabilizer in a drill string. Each of FIGS. 16A, 16B, and 16C depicts a different stabilizer blade attached to a stabilizer body. In FIG. 16A, the image of stabilizer body 1600A includes a single stabilizer blade 1602A with a marking "1" 1604A. In some examples, the stabilizer blade 1602A may not exhibit any damage or wear.

In FIG. 16B, the image of the stabilizer body 1600A includes a different stabilizer blade 1602B with a marking "2" 1604B. A region of stabilizer blade 1602B can indicate wear and damage near an edge 1606B of the stabilizer blade 1602B. In FIG. 16C, the image of the stabilizer body 1600A includes a different stabilizer blade 1602C with a marking "3" 1604C. A region of stabilizer blade 1602C can indicate wear and damage near an edge 1606C of the stabilizer blade 1602C. A neural network can detect the damage and wear to stabilizer blades 1602B and 1602C. The neural network can analyze the relationship between the damaged regions 1606B and 1606C of stabilizer blades 1602B and 1602C to determine a cause of the damage. For example, leading edge wear of the stabilizer blades 1602B and 1602C can indicate forward whirl.

Example Cluster Computing System

Figure 17:
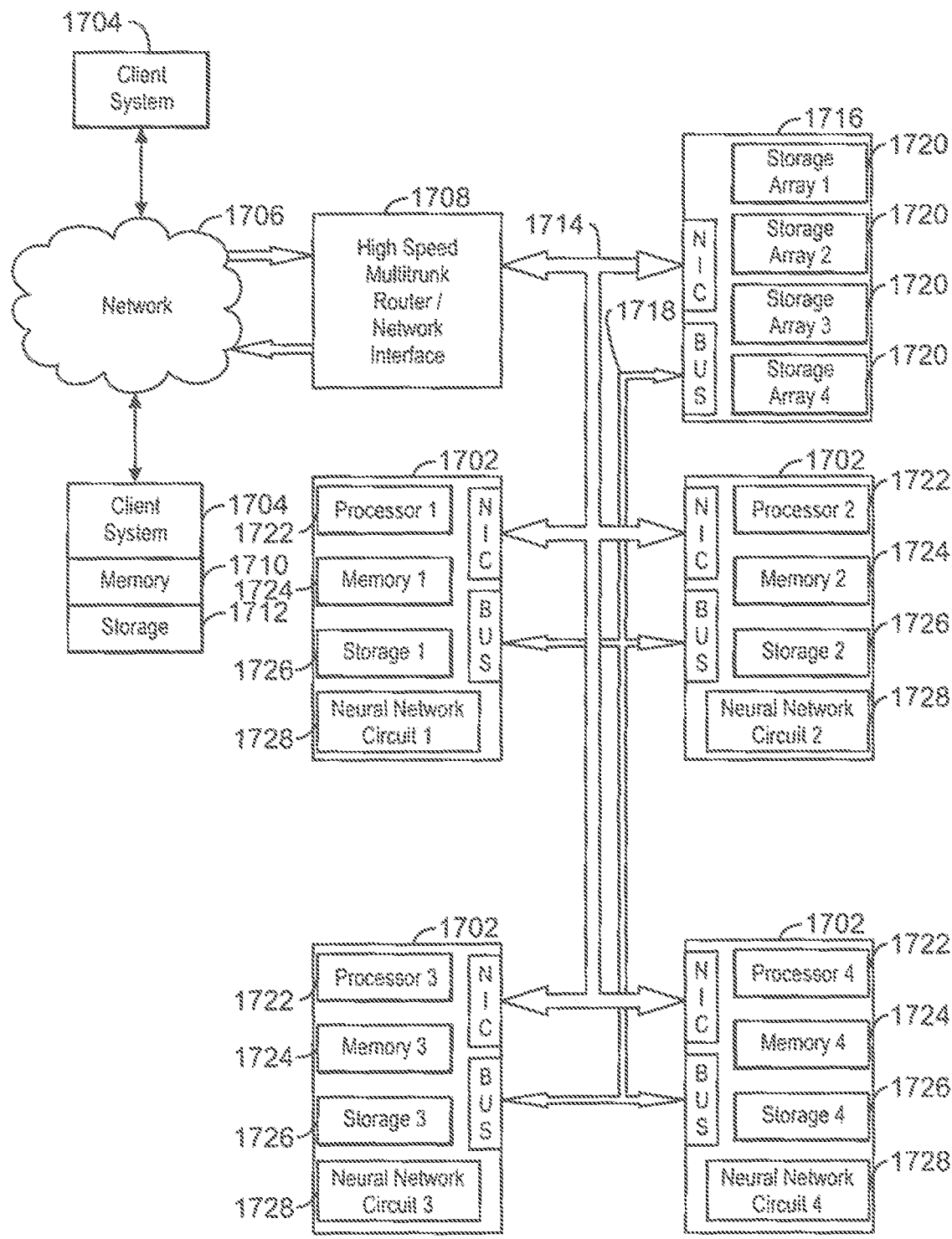
FIG. 17 is an example system diagram for executing neural networks that can identify components of a drill bit and bottom hole assembly and identify damage to the drill bit and bottom hole assembly.

FIG. 17 is a block diagram of an example cluster computing system 1700 that may be used in examples of the present techniques. The cluster computing system 1700 illustrated has four computing units 1702, each of which may perform calculations for part of the simulation model. However, one of ordinary skill in the art will recognize that the present techniques are not limited to this configuration, as any number of computing configurations may be selected. For example, a small simulation model may be run on a single computing unit 1702, such as a workstation, while a large simulation model may be run on a cluster computing system 1700 having 10, 100, 1000, or even more computing units 1702. In an example, each of the computing units 1702 will run the simulation for a single subdomain or group of computational cells. However, allocation of the computing units 1702 may be performed in any number of ways. For example, multiple sub regions may be allocated to a single computing unit 1702 or multiple computing units 1702 may be assigned to a single sub region, depending on the computational load on each computing unit 1702. Further, training and operations may be run on separate systems, with the more complex training operations run on the cluster computing system 1700, and the analysis using the trained model run on a client system 1704. The use of the model may be performed by the client system 1704 on an offshore platform, a local computer in a drill shack, or a tablet computer taking the image for analysis, among others.

The cluster computing system 1700 may be accessed from one or more client systems 1704 over a network 1706, for example, through a high speed network interface 1708. The network 1706 may include a local area network (LAN), a wide area network (WAN), the Internet, or any combinations thereof. Each of the client systems 1704 may have non-transitory, computer readable memory 1710 for the storage of operating code and programs, including random access memory (RAM) and read only memory (ROM). The operating code and programs may include the code used to implement all or any portions of the methods discussed herein. Further, the non-transitory computer readable media may store a neural network for identifying components of a drill bit and BHA, and identifying damage to the drill bit and BHA, for example, as shown in FIGS. 6A, 6B, 7, and 8 above. The client systems 1704 can also have other non-transitory, computer readable media, such as storage systems 1712. The storage systems 1712 may include one or more hard drives, one or more optical drives, one or more flash drives, any combinations of these units, or any other suitable storage device. In some examples, the storage systems 1712 are non-transitory, computer-readable media such as magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). The storage systems 1712 may be used for the storage of code, models, data, and other information used for implementing the methods described herein. For example, the data storage system may store a plurality of images of damaged components of drill bits and BHAs, as well as a plurality of images of undamaged components of drill bits and BHAs. The data storage system can also store trained neural networks that can identify components within an image of a drill bit or BHA and identify a cause of damage to the drill bit or BHA.

The high speed network interface 1708 may be coupled to one or more communications busses in the cluster computing system 1700, such as a communications bus 1714. The communication bus 1714 may be used to communicate instructions and data from the high speed network interface 1708 to a cluster storage system 1716 and to each of the computing units 1702 in the cluster computing system 1700. The communications bus 1714 may also be used for communications among computing units 1702 and the storage array 1716. In addition to the communications bus 1714 a high speed bus 1718 can be present to increase the communications rate between the computing units 1702 and/or the cluster storage system 1716.

The cluster storage system 1716 can have one or more tangible, computer readable media devices, such as storage arrays 1720 for the storage of data, visual representations, results, code, or other information, for example, concerning the implementation of and results from the methods of FIGS. 6A, 6B, and 8. The storage arrays 1720 may include any combinations of hard drives, optical drives, flash drives, holographic storage arrays, or any other suitable devices.

Each of the computing units 1702 can have a processor 1722 and associated local tangible, computer readable media, such as memory 1724 and storage 1726. The processor 1722 may include a single processing core, multiple processing cores, a GPU, or any combinations thereof. The memory 1724 may include ROM and/or RAM used to store code, for example, used to direct the processor 1722 to implement the methods illustrated in FIGS. 6A, 6B, and 8.

The storage 1726 may include one or more hard drives, one or more optical drives, one or more flash drives, or any combinations thereof. The storage 1726 may be used to provide storage for intermediate results, data, images, or code associated with operations, including code used to implement the methods of FIGS. 6A, 6B, and 8. In some examples, each of the computing units 1702 can include a neural network circuit 1728 that can train neural networks to identify components in a drill bit or bottom hole assembly and identify damage to a component of a drill bit or bottom hole assembly as described above.

The present techniques are not limited to the architecture or unit configuration illustrated in FIG. 17. For example, any suitable processor-based device may be utilized for implementing all or a portion of examples of the present techniques, including without limitation personal computers, networks personal computers, laptop computers, computer workstations, GPUs, mobile devices, and multi-processor servers or workstations with (or without) shared memory. Moreover, examples may be implemented on application specific integrated circuits (ASICs) or very large scale integrated (VLSI) circuits. In fact, persons of ordinary skill in the art may utilize any number of suitable structures capable of executing logical operations according to the examples.

While the present techniques may be susceptible to various modifications and alternative forms, the examples discussed above have been shown only by way of example. However, it should again be understood that the present techniques are not intended to be limited to the particular examples disclosed herein. Indeed, the present techniques include all alternatives, modifications, and equivalents falling within the true spirit and scope of the appended claims.

What is claimed is:

1. A method comprising:
   training a first neural network of a supervised learning model to identify a location, an extent, a type, and a consistency of damage to a drill bit or bottom hole assembly based on images depicting damaged components of the drill bit or bottom hole assembly;
   using the trained first neural network to identify the location, the extent, the type, and the consistency of damage to the drill bit or bottom hole assembly in at least one image obtained of the drill bit or bottom hole assembly;
   based on the identified the location, the extent, the type, and the consistency of damage to the drill bit or bottom hole assembly, training a second neural network of the supervised learning model to identify a cause of damage to the drill bit or bottom hole assembly;
   using the trained second neural network to identify the cause of damage to the drill bit or bottom hole assembly; and
   generating a graphical output based on the identified location, extent, type and consistency of damage to the drill bit or bottom hole assembly.

2. The method of claim 1, wherein the type indicates a fracture pattern of the damage to the drill bit or bottom hole assembly, wherein the fracture pattern comprises smooth wear, a tangential cutter fracture, spalling, heat checking, or blade wear scars.

3. The method of claim 1, wherein the extent indicates an amount of wear on the drill bit or bottom hole assembly below threshold levels.

4. The method of claim 1, wherein the supervised learning model comprises a scale-invariant feature transform (SIFT) technique, a histogram of gradients (HOG) technique, local binary patterns (LBP), or wavelet transforms, or any combinations thereof.

5. The method of claim 1, wherein the supervised learning model comprises linear discriminant analysis, a support vector machine, a k-nearest neighbor technique, a random forest learning technique, or any combination thereof.

6. The method of claim 1, further comprising generating a processed image by applying at least one modification to an image of the images depicting damaged components of the drill bit or bottom hole assembly, wherein the at least one modification comprises a rotation modification, a translation modification, a scaling modification, a red-green-blue (RGB) scale modification, or a hue-saturation-intensity (HSI) scale modification.

7. The method of claim 6, wherein generating the processed image further comprises modifying an image of the images depicting damaged components of the drill bit or bottom hole assembly to be from a uniform perspective.

8. The method of claim 1, wherein the trained first neural network of the supervised learning model extracts a feature from the at least one image obtained of the drill bit or bottom hole assembly.

9. The method of claim 8, wherein the feature is extracted based on performing edge detection.

10. The method of claim 1, comprising modifying a design of the drill bit or bottom hole assembly based on the identified cause of damage to the drill bit or bottom hole assembly.

11. The method of claim 1, wherein the location indicates a spatial orientation and a position with respect to the drill bit or bottom hole assembly.

12. The method of claim 1, wherein the consistency indicates whether damage is repeated in other locations on the drill bit or bottom hole assembly.

13. A system comprising:
   a processor to:
   train a first neural network of a supervised learning model to identify a location, an extent, a type, and a consistency of damage to the drill bit or bottom hole assembly based on images depicting damaged components of the drill bit or bottom hole assembly;
   identify via the trained first neural network, the location, the extent, the type, and the consistency of damage to the drill bit or bottom hole assembly in an at least one image obtained of the drill bit or bottom hole assembly;
   train a second neural network of the supervised learning model to identify a cause of damage to the drill bit or bottom hole assembly based on the identified the location, the extent, the type, and the consistency of damage to the drill bit or bottom hole assembly;
   identify, via the trained second neural network, the cause of damage to the drill bit or bottom hole assembly; and
   generate a graphical output based on the identified location, extent, type and consistency of damage to the drill bit or the bottom hole assembly.

14. The system of claim 13, wherein the type indicates a fracture pattern of the damage to the drill bit or bottom hole assembly, wherein the fracture pattern comprises smooth wear, a tangential cutter fracture, spalling, heat checking, or blade wear scars.

15. The system of claim 13, wherein the extent indicates an amount of drill bit wear or an amount of bottom hole assembly wear below threshold levels.

16. The system of claim 13, wherein the supervised learning model comprises linear discriminant analysis, a support vector machine, a k-nearest neighbor technique, a random forest learning technique, or any combination thereof.

17. One or more non-transitory computer-readable media for characterizing damage to a bit or a bottom hole assembly comprising a plurality of instructions that, in response to execution by a processor, cause the processor to:
- train a first neural network of a supervised learning model to identify a location, an extent, a type, and a consistency of damage to the drill bit or bottom hole assembly based on images depicting damaged components of the drill bit or bottom hole assembly;
- identify via the trained first neural network, the location, the extent, the type, and the consistency of damage to the drill bit or bottom hole assembly in an at least one image obtained of the drill bit or bottom hole assembly;
- train a second neural network of the supervised learning model to identify a cause of damage to the drill bit or bottom hole assembly based on the identified the location, the extent, the type, and the consistency of damage to the drill bit or bottom hole assembly;
- identify, via the trained second neural network, the cause of damage to the drill bit or bottom hole assembly; and
- generate a graphical output based on the identified location, extent, type and consistency of cause of damage to the drill bit or the bottom hole assembly.

18. The one or more non-transitory computer-readable media of claim 17, wherein the plurality of instructions direct the processor to recommend a design of the drill bit or bottom hole assembly based on the identified cause of damage to the drill bit or bottom hole assembly.

* * * * *